US008384956B2

(12) United States Patent
Nakano

(10) Patent No.: US 8,384,956 B2
(45) Date of Patent: Feb. 26, 2013

(54) IMAGE PROCESSING APPARATUS GENERATING AN IMAGE PROCESSING FLOW FOR EACH SEGMENTED BLOCK OF IMAGE DATA AND CORRESPONDING, IMAGE PROCESSING METHOD, AND STORAGE MEDIUM STORING PROGRAM INSTRUCTING A COMPUTER TO EXECUTE THE METHOD

(75) Inventor: Toshimitsu Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 771 days.

(21) Appl. No.: 12/544,651

(22) Filed: Aug. 20, 2009

(65) Prior Publication Data

US 2010/0053685 A1    Mar. 4, 2010

(30) Foreign Application Priority Data

Aug. 26, 2008  (JP) .................................. 2008-216919

(51) Int. Cl.
*G06K 15/00* (2006.01)
(52) U.S. Cl. ......................................... 358/2.1; 712/214
(58) Field of Classification Search ........................ None
See application file for complete search history.

(56) References Cited

U.S. PATENT DOCUMENTS

2008/0313432 A1* 12/2008 Bryant et al. ................. 712/214

FOREIGN PATENT DOCUMENTS

| JP | 2007-81795 | | 3/2007 |
| JP | 2007081795 A | * | 3/2007 |

* cited by examiner

*Primary Examiner* — Twyler Haskins
*Assistant Examiner* — Christopher D Wait
(74) *Attorney, Agent, or Firm* — Fitzpatrick, Cella, Harper & Scinto

(57) ABSTRACT

An image processing method includes: selecting an image processing module for each attribute associated with a block of image data in accordance with the content of image processing made to correspond to the attribute; generating an image processing flow for each block by use of the selected image processing module; and determining whether the image processing flow can be constructed in an image processing area. When it is determined that a processing area of the image processing flow cannot be constructed in the image processing area, the method selects an image processing flow having an image processing module which is not contained in the other image processing flows from among a plurality of the image processing flows the blocks, the selected image processing flow being constructed in the image processing area such that the processing area of the image processing flow is included in the image processing area.

7 Claims, 25 Drawing Sheets

|   | A   | B   | C   | D   | E   | F   |
|---|-----|-----|-----|-----|-----|-----|
| 1 | No0 | No0 | No1 | No1 | No1 | No0 |
| 2 | No1 | No1 | No1 | No1 | No1 | No0 |
| 3 | No1 | No1 | No1 | No1 | No1 | No0 |
| 4 | No1 | No1 | No2 | No2 | No2 | No3 |
| 5 | No4 | No4 | No5 | No3 | No3 | No3 |
| 6 | No4 | No4 | No5 | No3 | No3 | No3 |
| 7 | No4 | No4 | No6 | No6 | No7 | No7 |
| 8 | No4 | No4 | No8 | No8 | No9 | No9 |
| 9 | No4 | No4 | No4 | No4 | No0 | No0 |

FIG.6

| No | SCAN IMAGE | IMAGE | CHARACTER | GRAPHIC |
|---|---|---|---|---|
| 0 | — | — | — | — |
| 1 | ○ | — | — | — |
| 2 | ○ | — | — | ○ |
| 3 | — | — | — | ○ |
| 4 | — | ○ | — | — |
| 5 | — | ○ | — | ○ |
| 6 | — | ○ | ○ | ○ |
| 7 | — | — | ○ | ○ |
| 8 | — | ○ | ○ | — |
| 9 | — | — | ○ | — |

FIG.7

| PROCESSING \ ATTRIBUTE | SCAN IMAGE | IMAGE | CHARACTER | GRAPHIC |
|---|---|---|---|---|
| BACKGROUND REMOVAL | ON | OFF | OFF | OFF |
| COLOR CONVERSION | SCAN IMAGE | IMAGE | CHARACTER | GRAPHIC |
| DENSITY CORRECTION | 2 | 0 | 0 | 0 |
| FILTER | ON | OFF | OFF | OFF |
| HALFTONE | ERROR DIFFUSION | GRADATION | RESOLUTION | GRADATION |
| SMOOTHING | OFF | OFF | ON | ON |

FIG.9

| PROCESSING \ No | 0 | 1 | 2 | 3 | 4 | 5 | 6 | 7 | 8 | 9 |
|---|---|---|---|---|---|---|---|---|---|---|
| BACKGROUND REMOVAL | OFF | ON | ON/OFF | OFF | OFF | OFF | OFF | OFF | OFF | OFF |
| COLOR CONVERSION | SIMPLE CONVERSION | SCAN IMAGE | SCAN IMAGE/ GRAPHIC | GRAPHIC | IMAGE | IMAGE/ GRAPHIC | IMAGE/ CHARACTER/GRAPHIC | CHARACTER/ GRAPHIC | IMAGE/ CHARACTER | CHARACTER |
| DENSITY CORRECTION | 0 | 2 | 2/0 | 0 | 0 | 0 | 0 | 0 | 0 | 0 |
| FILTER | OFF | ON | ON/OFF | OFF | OFF | OFF | OFF | OFF | OFF | OFF |
| HALFTONE | THROUGH | ERROR DIFFUSION | ERROR DIFFUSION/ GRADATION | GRADATION | GRADATION | GRADATION | GRADATION/ RESOLUTION | RESOLUTION/ GRADATION | GRADATION/ RESOLUTION | RESOLUTION |
| SMOOTHING | OFF | OFF | OFF | ON | OFF | OFF/ON | OFF/ON | OFF/ON | OFF/ON | ON |

FIG.10

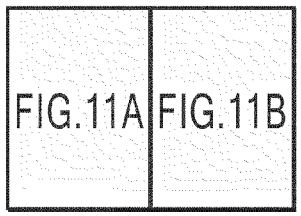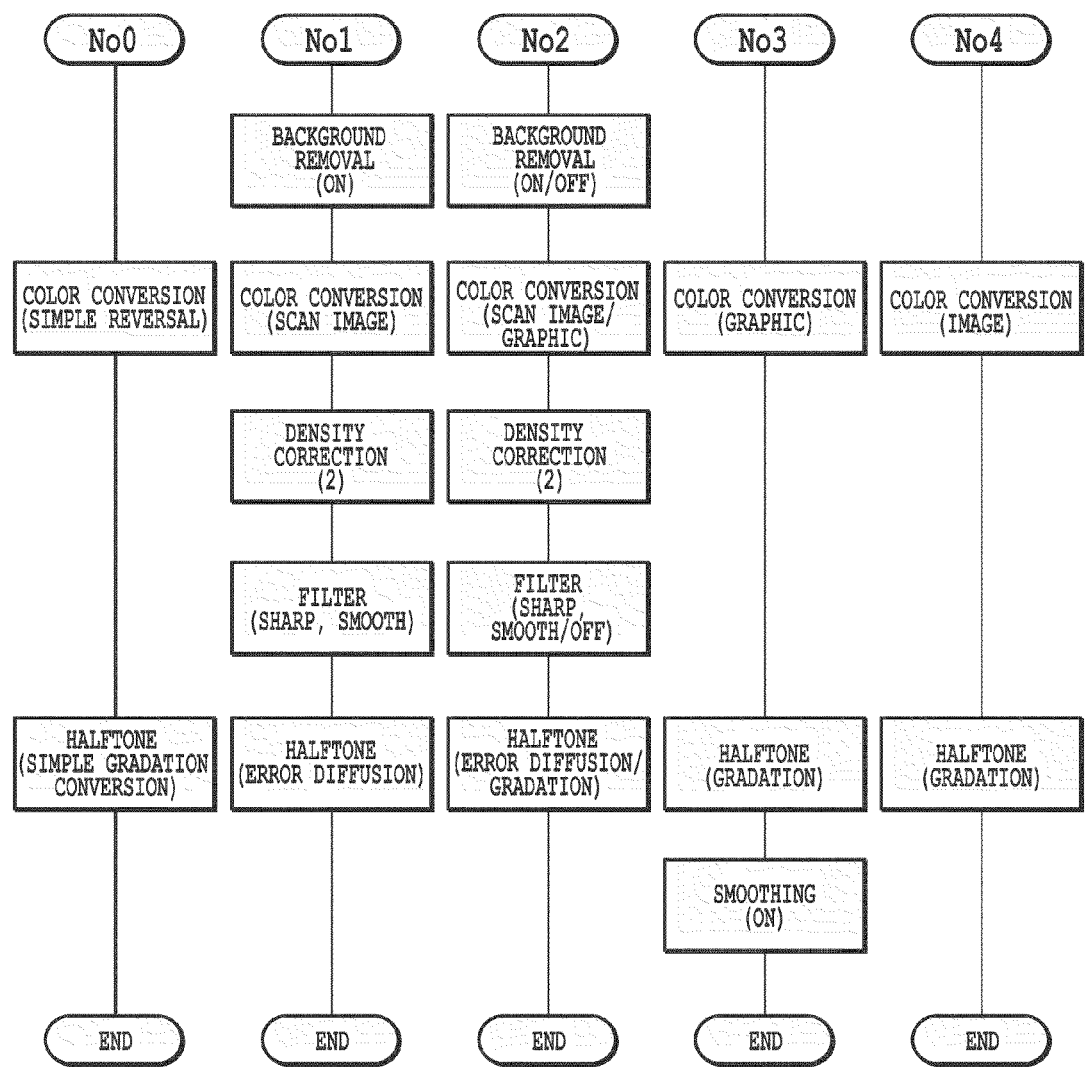
FIG.11A

|   | A | B | C | D | E | F |
|---|---|---|---|---|---|---|
| 1 | No0 | No0 | No3 | No3 | No0 | No0 |
| 2 | No3 | No3 | No3 | No3 | No3 | No3 |
| 3 | No3 | No3 | No3 | No3 | No3 | No3 |
| 4 | No3 | No3 | No3 | No3 | No3 | No3 |
| 5 | No3 | No3 | No3 | No3 | No3 | No3 |
| 6 | No3 | No3 | No3 | No3 | No3 | No3 |
| 7 | No0 | No3 | No7 | No7 | No7 | No9 |
| 8 | No0 | No0 | No9 | No9 | No9 | No9 |
| 9 | No0 | No0 | No0 | No0 | No0 | No0 |

FIG.15

| IMAGE PROCESSING FLOW | NUMBER OF BLOCKS | ALLOCATION RATE |
|---|---|---|
| No0 (BACKGROUND) | 13 | 20% |
| No3 (GRAPHIC) | 33 | 52% |
| No7 (CHARACTER/GRAPHIC) | 3 | 5% |
| No9 (CHARACTER) | 5 | 8% |

FIG.19

IMAGE PROCESSING APPARATUS GENERATING AN IMAGE PROCESSING FLOW FOR EACH SEGMENTED BLOCK OF IMAGE DATA AND CORRESPONDING, IMAGE PROCESSING METHOD, AND STORAGE MEDIUM STORING PROGRAM INSTRUCTING A COMPUTER TO EXECUTE THE METHOD

BACKGROUND OF THE INVENTION

1. Field of the Invention

The present invention relates to an image processing apparatus, an image processing method, a program, and a storage medium, which are for performing high-speed image processing onto image data.

2. Description of the Related Art

A multifunctional peripheral having the functions of a copier, a printer, and the like, executes image processes such as color conversion and gradation processing of image data, to perform printing. In accordance with the development of high-speed and high-resolution multifunctional peripherals, it is necessary for image processing units of such multifunctional peripherals to perform high-speed processing of large volumes of image data.

As a technique for performing high-speed image processing, there is a technique of achieving high-speed image processing such that a plurality of image processing units are provided in a multifunctional peripheral to perform image processings in parallel.

In such a case, a multifunctional peripheral has a plurality of image processors to segment image data into blocks. Then, the multifunctional peripheral determines attributes of image data in the respective blocks of the image data and processing loads of image processes corresponding to the attributes, and performs grouping of the respective blocks into a number of image processors so as to even up its total loading.

With respect to the respective image processors of the multifunctional peripheral, an image processing flow including only image processing algorithms necessary for the image data in the respective blocks allocated by grouping is loaded into each image processor. Then, the image data in the respective blocks are supplied to each image processor, and image processes are executed on the image data in parallel, which enables to perform high-speed image processing (for example, Japanese Patent Laid-Open No. 2007-81795).

However, the number of image processors retained by the multifunctional peripheral is fixed, and a single image processing flow is allowed to be loaded into one image processor. Therefore, there is a problem that image processes to be executed on blocked image data cannot be performed in parallel over the number of image processors.

Further, the image processes have a large number of functions in order to correspond to various drawing modes, and in order to perform all the functions of the image processes, it is necessary for the multifunctional peripheral to have a high-capacity image processing area and a use memory. Therefore, assuming that many drawing modes exist in the image data in the respective blocks allocated by grouping, it is necessary for each image processor to save the maximum image processing area and memory which are necessary for its image processes. Therefore, in image processing in a simple drawing mode, an unused image processing area and memory are brought about, which is wasteful. Moreover, there is a problem that an enormous image processing area and memory are required in order to perform many image processes in parallel.

In order to solve such problems, an object of the present invention is to provide devices for constructing all image processing flows necessary for image processes on image data in the respective blocks and the maximum number of image processing flows in accordance with a capacity of an image processing area in an image processing area.

SUMMARY OF THE INVENTION

In order to solve the above-described problem, an image processing apparatus according to the present invention includes a segmentation unit that segments image data into a plurality of blocks, a discrimination unit that discriminates an attribute in each of the segmented blocks, a generating unit that selects an image processing module for each attribute in accordance with the discriminated attribute and the content of an image process corresponding to the attribute to generate an image processing flow for each attribute by use of the selected image processing module, a determination unit that determines whether or not the image processing flow can be constructed in an image processing area, and a constructing unit that constructs the image processing flow in the image processing area when it is determined that the image processing flow can be constructed in the image processing area as a result of the determination, and when it is determined that a processing area of the image processing flow cannot be constructed in the image processing area as a result of the determination, the constructing unit selects an image processing flow having an image processing module which is not held by the other image processing flows from among a plurality of the image processing flows generated for each attribute, to construct the selected image processing flow in the image processing area such that the processing area of the image processing flow is included in the image processing area.

In accordance with an embodiment of the present invention, when performing image processes in parallel due to blocking of an image, economical parallel processing by use of an image processing area to the maximum extent is possible, which makes it possible to perform the image processes at high speed.

Further features of the present invention will become apparent from the following description of exemplary embodiments (with reference to the attached drawings).

BRIEF DESCRIPTION OF THE DRAWINGS

FIG. 6 is a diagram showing an example of blocking of image data;

FIG. 7 is a table showing an example of combinations of attributes;

FIG. 9 is a table showing setting values of image processing modules for the respective attributes;

FIG. 10 is a table showing image processing modules necessary for respective block groups;

FIG. 11 is a diagram showing the relationship of FIGS. 11A and 11B;

FIG. 11A is a view showing image processing flows of the block groups;

FIG. 15 is a diagram showing an example of blocking of image data in Embodiment 2;

FIG. 19 is a table showing an example of the numbers of blocks to be allotted and allocation rates thereof;

DESCRIPTION OF THE EMBODIMENTS

Hereinafter, best modes for carrying out the present invention will be described with reference to the drawings.

Embodiment 1

<Image Processing System (FIG. 1)>

Figure 1:
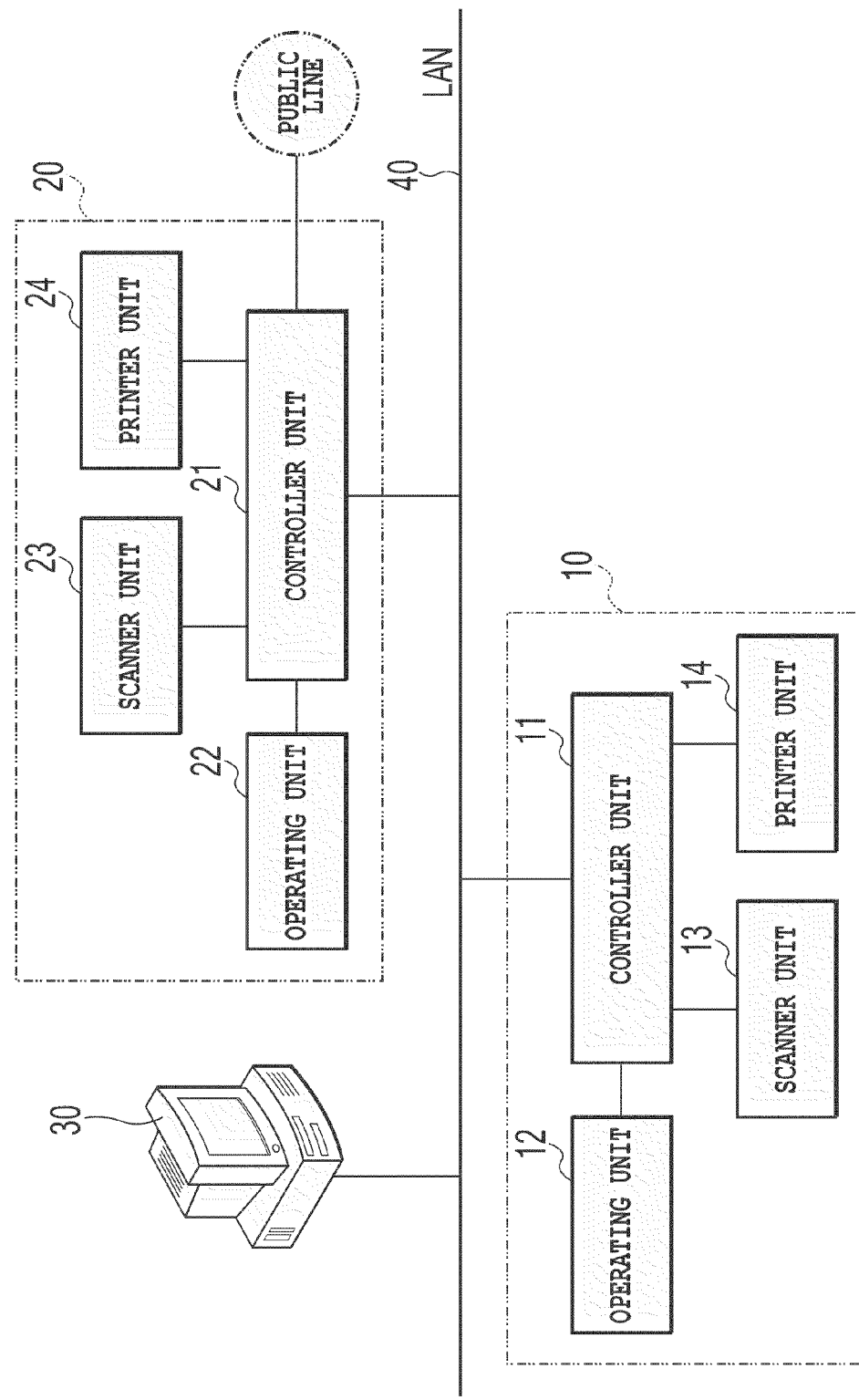
FIG. 1 is a diagram showing an image processing system.

Embodiment 1 will be described in detail with reference to the drawings. FIG. 1 is a diagram showing an image processing system according to the embodiment of the present invention. A host computer 30 and two image processing apparatuses (10 and 20) are connected to a LAN 40 in this system. However, in the image processing system of the present invention, the number of connections is not limited to this number. Further, the LAN is applied as a connection method in the present embodiment. However, the connection method is not limited to a LAN. For example, a given network such as a WAN (public line), a serial transmission system such as a USB, or a parallel transmission system such as a Centronics interface and SCSI may be applied as a connection method.

The host computer (hereinafter, called PC) 30 functions as a personal computer. The PC 30 is capable of sending/receiving files or sending/receiving e-mails by use of FTP and/or SMB protocols via the LAN 40 or a WAN. Moreover, the PC 30 is capable of issuing a print command via a printer driver to the image processing apparatuses 10 and 20 through LAN 40.

The image processing apparatuses 10 and 20 are the same, which are image processing apparatuses respectively having scanner units. Hereinafter, for ease of explanation, the focus is on the image processing apparatus 10 out of the image processing apparatuses 10 and 20, to be described in detail.

The image processing apparatus 10 has a scanner unit 13 serving as an image input device, a printer unit 14 serving as an image output device, a controller unit 11 that manages operation control of the entire image processing apparatus 10, and an operating unit 12 serving as a user interface (UI). Here, in the image processing apparatus 10, the operating unit 12, the scanner unit 13, and the printer unit 14 are connected to the controller unit 11.

The image processing apparatus 20 has a scanner unit 23 serving as an image input device, a printer unit 24 serving as an image output device, a controller unit 21 that manages operation control of the entire image processing apparatus 20, and an operating unit 22 serving as a user interface (UI). Here, in the image processing apparatus 20, the operating unit 22, the scanner unit 23, and the printer unit 24 are connected to the controller unit 21.

<Detailed Description of the Controller Unit 11 (FIG. 2)>

Figure 2:
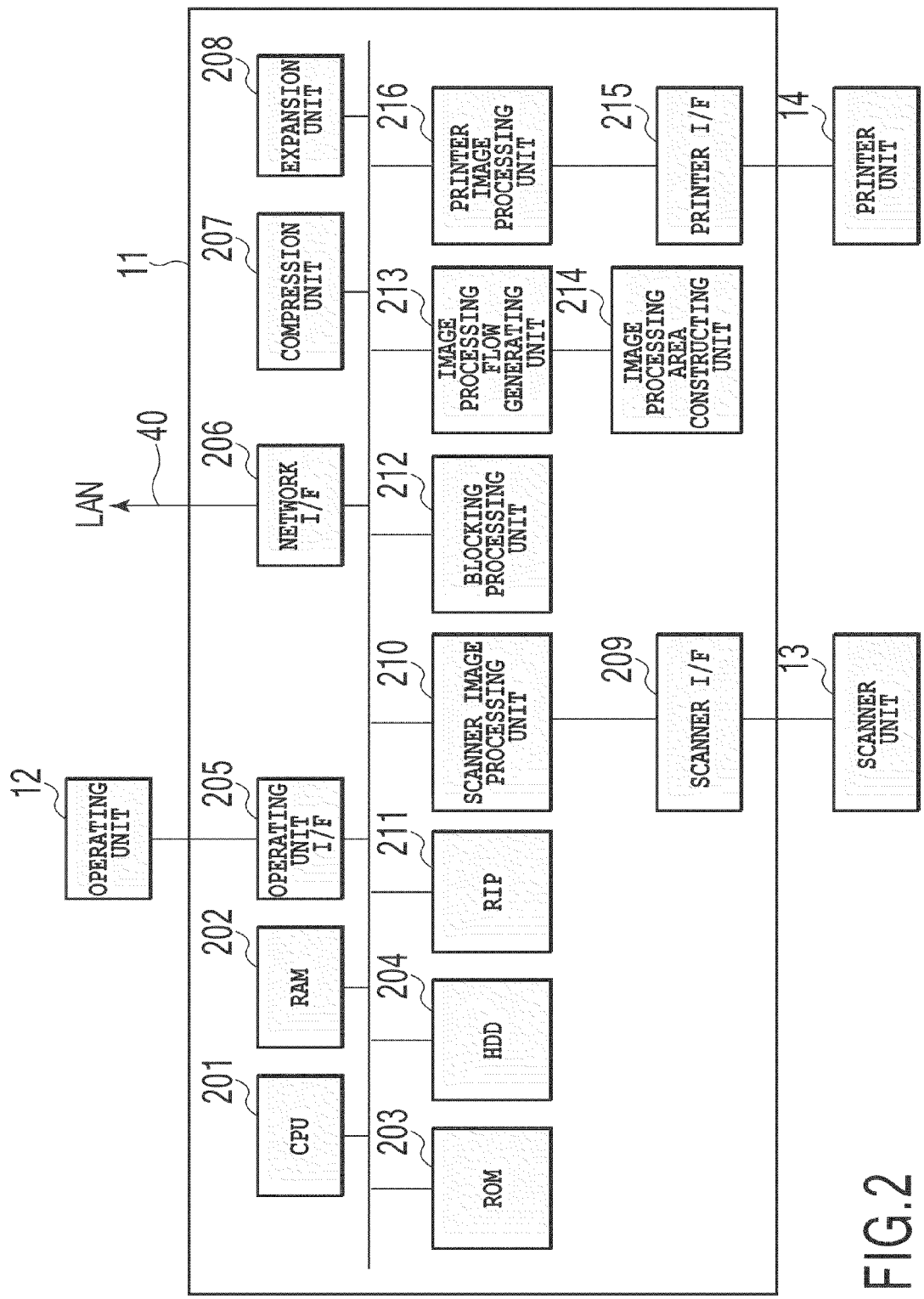
FIG. 2 is a diagram for a further detailed explanation of a controller unit 11 in an image processing apparatus 10.

FIG. 2 is a diagram for a further detailed explanation of the controller unit 11 in the image processing apparatus 10.

The controller unit 11 is electrically connected to the scanner unit 13 and the printer unit 14, and on the other hand, the controller unit 11 is connected to an external image processing device, such as the PC 30, via a network such as the LAN 40. Thereby, it is possible to input and output image data or device information.

A CPU 201 in FIG. 2 controls accesses to various connecting devices overall on the basis of a control program stored in a ROM 203, and controls image processes executed inside the controller unit overall. A RAM 202 is a system work memory in which the CPU 201 operates, and a memory for temporarily storing image data. The RAM 202 has an SRAM for retaining stored content even after power is turned off, and a DRAM from which stored content is erased after power is turned off. A boot program for the apparatus and the like are stored in the ROM 203. An HDD 204 is a hard disk drive, and is capable of storing system software and image data therein.

An operating unit I/F 205 is an interface for connecting to the operating unit 12. The operating unit I/F 205 outputs image data to be displayed on the operating unit 12 to the operating unit 12, and obtains information input from the operating unit 12.

A network I/F 206 is connected to the LAN 40, to transmit and receive image data and information. An expansion unit 208 expands the received compressed image data. A compression unit 207 compresses the image data before transmission into a size suitable for network transmission.

A scanner image processing unit 210 performs corrections, processes, and edits for image data received from the scanner unit 13 via a scanner I/F 209. In addition, the scanner image processing unit 210 determines attributes of the received image data, and attaches the attributes to the image data.

An RIP 211 receives intermediate data generated on the basis of PDL code data transmitted from the PC 30 or the like, to generate bit-mapped (multivalued) image data.

A blocking processing unit 212 segments image data into blocks with small regions, to generate block groups in accordance with the attributes. The details of the blocking processing unit 212 will be described later.

An image processing flow generating unit 213 selects necessary image processing modules on the basis of the attributes of the image data in the block groups to generate image processing flows, and an image processing area constructing unit 214 constructs the generated image processing flows in an image processing area of a printer image processing unit 216. The details of the image processing flow generating unit 213 and the image processing area constructing unit 214 will be described later.

The printer image processing unit 216 receives the blocked image data, and executes image processes on the image data with reference to the attributes attached to the image data. The printer image processing unit 216 has the image processing area, and is capable of constructing a plurality of image processing flows and updating those therein. The image data, after undergoing the image processes, is output to the printer unit 14 via the printer I/F 215. The details of the processings executed in the printer image processing unit 216 will be described later.

<Image Processings in the Printer (FIG. 3)>

Figure 3:
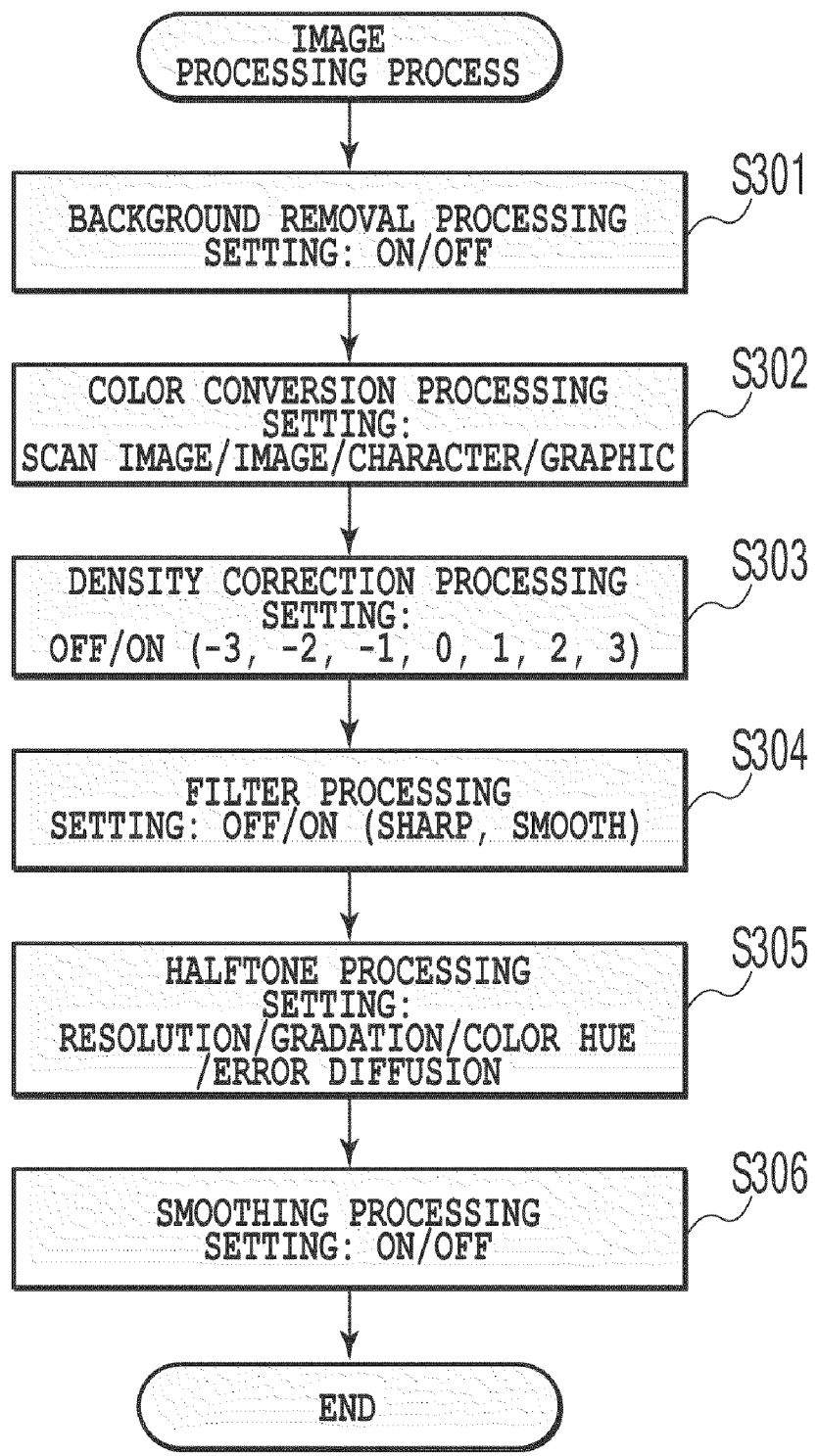
FIG. 3 is a chart showing an image processing process to be executed on image data in a printer image processing unit 216.

FIG. 3 shows an image processing process to be executed onto image data in the printer image processing unit 216.

The image processing process includes the following image processing modules. That is, a background removal processing (step S301), a color conversion processing (step S302), a density correction processing (step S303), a filter processing (step S304), a halftone processing (step S305), and a smoothing processing (step S306) are included. Then, the image processing modules included in the image processing process of FIG. 3 have a plurality of setting values, and image processes are executed on the image data in accordance with the setting values.

The background removal processing (step S301) executes processes of clearing away (removing) a background color of the image data, and has settings of ON/OFF. When the setting of background removal processing (step S301) is "ON," the background removal processing is operation executed, and when the setting of background removal processing (step S301) is "OFF," the background removal processing is operation not executed.

The color conversion processing (step S302) executes conversion of color signals in accordance with attributes of image data. For example, image data input as RGB color signals are converted into image data as CMY color signals. The color conversion processing has settings of Scan image/image/character/graphic. When the setting of color conversion processing is "Scan image," color conversion processing most suitable for a scan image is executed. Further, when the setting of color conversion processing is "image," color conversion processing most suitable for a photograph (an image) is executed. Further, when the setting of color conversion processing is "character," color conversion processing most suitable for character is executed. Further, when the setting of color conversion processing is "graphic," color conversion processing most suitable for graphic is executed.

The density correction processing (step S303) adjusts the densities of output colors (CMYK). The density correction processing has settings of OFF/ON (−3, −2, −1, 0, 1, 2, 3). When the setting of density correction processing is "OFF," density correction processing is not executed. Further, when the setting of density correction processing is "ON," density levels are adjusted in accordance with a value of, for example, "(−3, −2, −1, 0, 1, 2, 3)," and density correction processing is executed.

The filter processing (step S304) sharpens the contrasting density of image data, or smooths it inversely. The filter processing has settings of OFF/ON (sharp, smooth). When the setting of filter processing is "OFF," filter processing is not executed. Further, when the setting of filter processing is "ON" and "sharp," filter processing is executed so as to sharpen an image. Further, when the setting of filter processing is "ON" and "smooth," filter processing is executed so as to smooth an image.

The halftone processing (step S305) executes gray scale processing so as to correspond to the number of gradations to be output by the printer unit. For example, the halftone processing binarizes received high-gradation image data or makes the image data 32-valued image data. The halftone processing (step S305) has settings of resolution/gradation/color hue/error diffusion, and executes halftone processing corresponding to the settings of "resolution," "gradation," "color hue," and "error diffusion."

The smoothing processing (step S306) is processing for smoothing unevenness of edge portions of a character or graphic, and has settings of OFF/ON. When the setting of smoothing processing (step S306) is "ON," smoothing processing is executed, and when the setting of smoothing processing (step S306) is "OFF," smoothing processing is not executed.

The printer image processing unit 216 in FIG. 2 retains the image processing area in which image processing flows are constructed. The image processing area is a rewritable finite region, and a plurality of image processing flows are constructed therein, which makes it possible to perform the image processings in parallel.

When the image processing area of the printer image processing unit 216 in FIG. 2 is mounted as hardware, image processing flows are constructed on a finite silicon area such as an FPGA. Further, when the image processing area is mounted as software, image processing flows are constructed as program texts in a finite memory region.

<Detailed Description of the Blocking Processing Unit 212>

Figure 4:
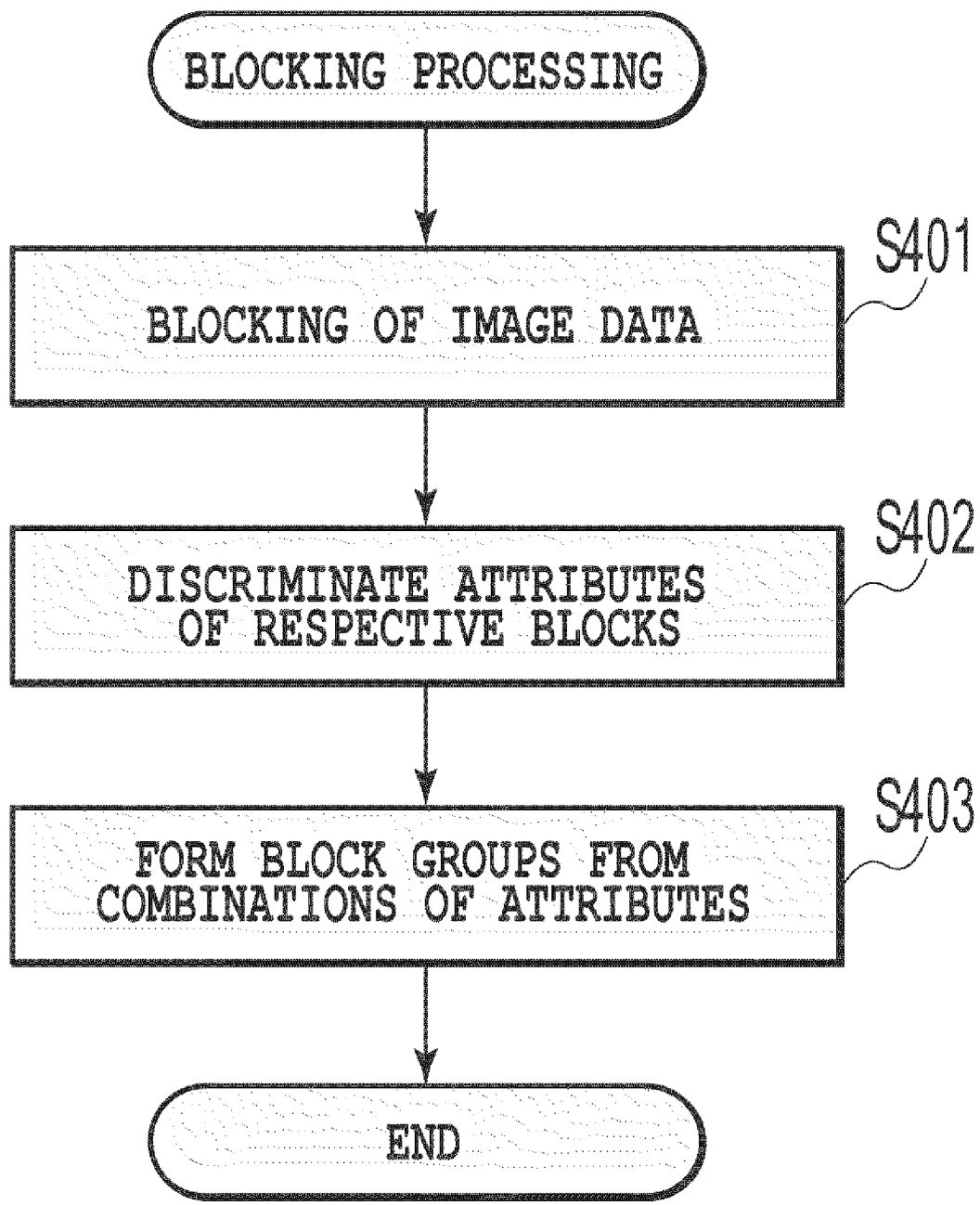
FIG. 4 is a view showing a flowchart of processings of a blocking processing unit 212 in the image processing apparatus 10.

FIG. 4 is a view showing a flowchart of processings executed by the blocking processing unit 212 in the image processing apparatus 10.

Figure 5:
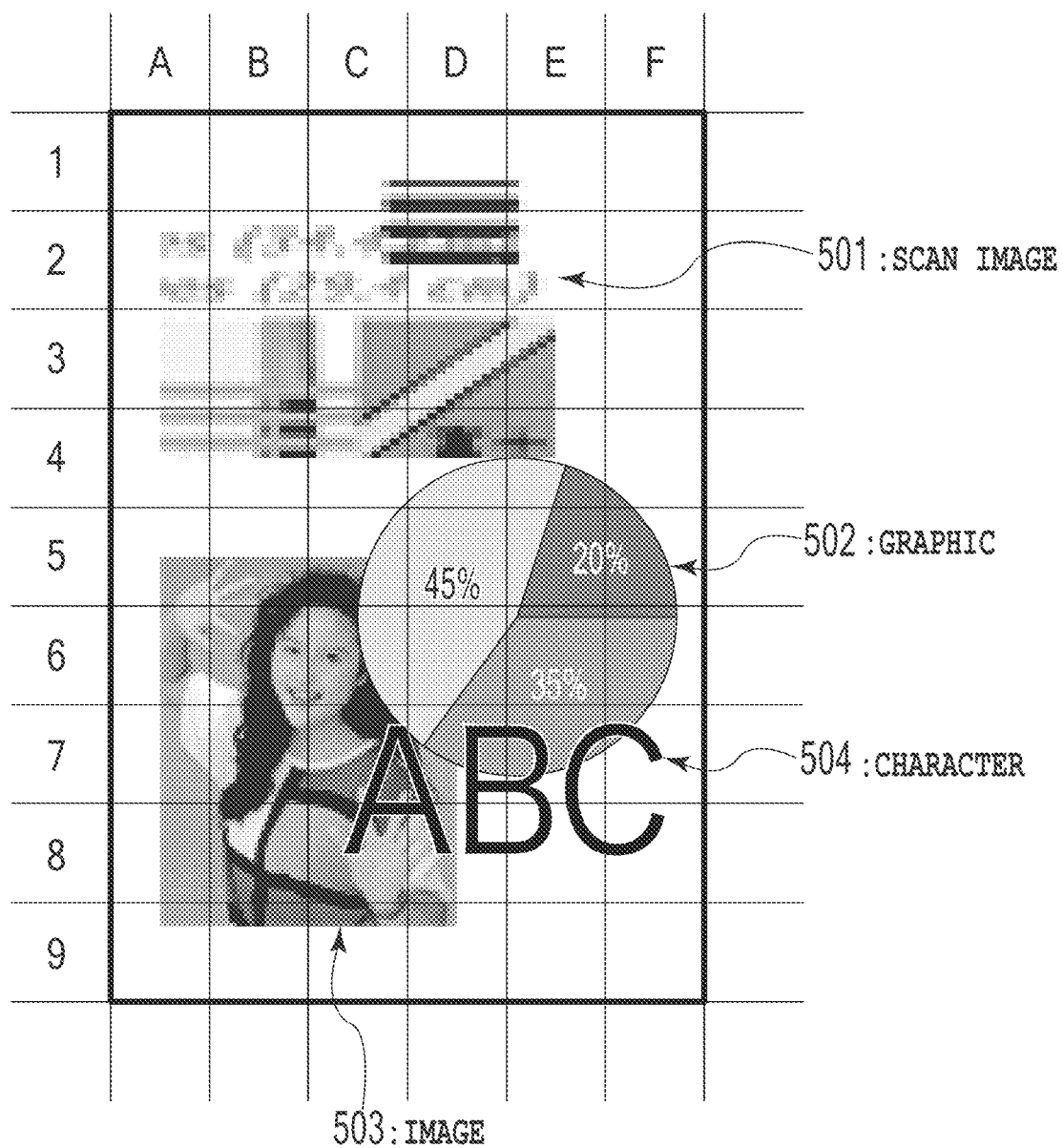
FIG. 5 is a diagram showing an example of image data.

First, in step S401, the blocking processing unit 212 segments image data into a plurality of blocks with small regions. FIG. 5 shows an example of image data. The image data includes a Scan image 501, a graphic 502, an image 503, and characters 504. For example, in step S401, this image data is segmented into six segments from A to F transversely and is segmented into nine segments from 1 to 9 longitudinally, to have 54 blocks in total by the blocking processing unit 212.

Next, in step S402, the blocking processing unit 212 discriminates attributes of the respective blocks segmented in step S401. For example, in a case of block A1 in FIG. 5 (the block corresponding to the longitudinal A and the transverse 1 is denoted by A1), because there is no attribute therein, it is determined that there is no attribute. When there are some attributes, the attributes include, for example, any one or some of a Scan image, a graphic, an image, and a character. For example, in a case of block C5 in FIG. 5, there exist two attributes of the image 503 and the graphic 502 therein. In the same way, attributes in all the blocks are discriminated.

Next, in step S403, the blocking processing unit 212 collects and classifies blocks with the same attributes, to form block groups. For example, in the image data of FIG. 5, there are combinations of attributes in 10 patterns from No0 to No9 as shown in FIG. 7. The respective blocks are discriminated as shown in FIG. 6, to form ten types of block groups.

<Detailed Description of the Image Processing Flow Generating Unit 213>

Figure 8:
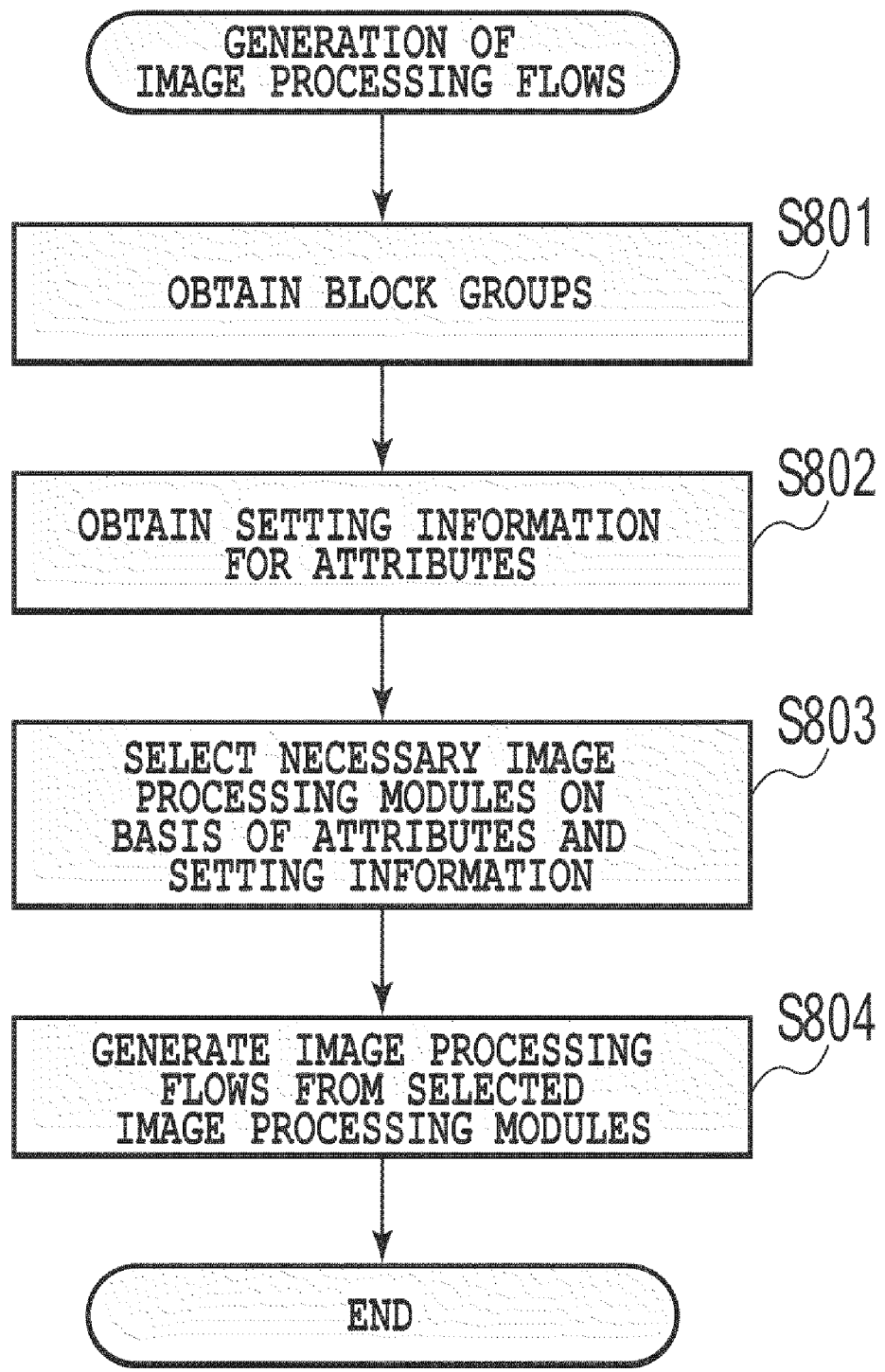
FIG. 8 is a view showing a flowchart of processings of an image processing flow generating unit 213 in the image processing apparatus 10.

FIG. 8 is a view showing a flowchart of processings of the image processing flow generating unit 213 in the image processing apparatus 10.

In step S801, first, the image processing flow generating unit 213 obtains the block groups of the image data formed by the blocking processing unit 212.

Next, in step S802, the image processing flow generating unit 213 obtains setting information on image processing modules for the respective attributes that are "Scan image," "image," "character," and "graphic."

FIG. 9 shows setting values of the image processing modules for the respective attributes that are "Scan image," "image," "character," and "graphic." The setting values of the image processing modules may be set as initial settings, for example, from the operating unit 12, or may be determined by setting from a printer driver via the PC 30.

In FIG. 9, as an example, with respect to the Scan image, the setting of background removal processing is set to "ON," the setting of color conversion processing is set to "Scan image," and the setting of density correction processing is set to "2." Further, in FIG. 9, as an example, with respect to Scan image, the setting of filter processing is set to "ON," the setting of halftone processing is set to "error diffusion," and the setting of smoothing processing is set to "OFF." In FIG. 9, in the same way, the settings of the image processing modules are set with respect to image, character, and graphic as well.

Next, in step S803 in FIG. 8, the image processing flow generating unit 213 selects image processing modules necessary for executing image processings onto the image data in the respective block groups in accordance with the attributes of the respective block groups and the setting information of the image processing modules.

On the basis of the setting information of the image processing modules for the respective attributes in FIG. 9 and the attribute information of the respective block groups from No0 to No9, the image processing modules necessary for the respective block groups are as shown in FIG. 10. For example, as shown in FIG. 7, the attributes included in the No5 block group are an image and a graphic.

Then, as shown in FIG. 9, as the image processing modules for an image, the setting of background removal processing is "OFF," the setting of color conversion processing is "image," the setting of density correction processing is "0," and the setting of filter processing is "OFF." Further, as shown in FIG. 9, as the image processing modules for an image, the setting of halftone processing is "gradation," and the setting of smoothing processing is "OFF."

Further, as shown in FIG. 9, as the image processing modules for a graphic, the setting of background removal processing is "OFF," the setting of color conversion processing is "graphic," the setting of density correction processing is "0," and the setting of filter processing is "OFF." Further, as shown in FIG. 9, as the image processing modules for the graphic, the setting of halftone processing is "gradation," and the setting of smoothing processing is "ON." Therefore, as shown in FIG. 10, in the image processing modules necessary for the No5 block group, the setting of color conversion processing is "graphic/character," the setting of halftone processing is "gradation," and the setting of smoothing processing is "ON/OFF."

In FIG. 10, the settings of grayout portions are "OFF," and the image processing modules are unnecessary in the image processing process.

In the same way as described above, the image processing flow generating unit 213 selects image processing modules necessary for the other block groups other than the No5 block group.

Next, in step S804 in FIG. 8, the image processing flow generating unit 213 generates image processing flows of the respective block groups from the image processing modules necessary for the respective block groups in FIG. 10 selected in step S803.

Figure 11B:
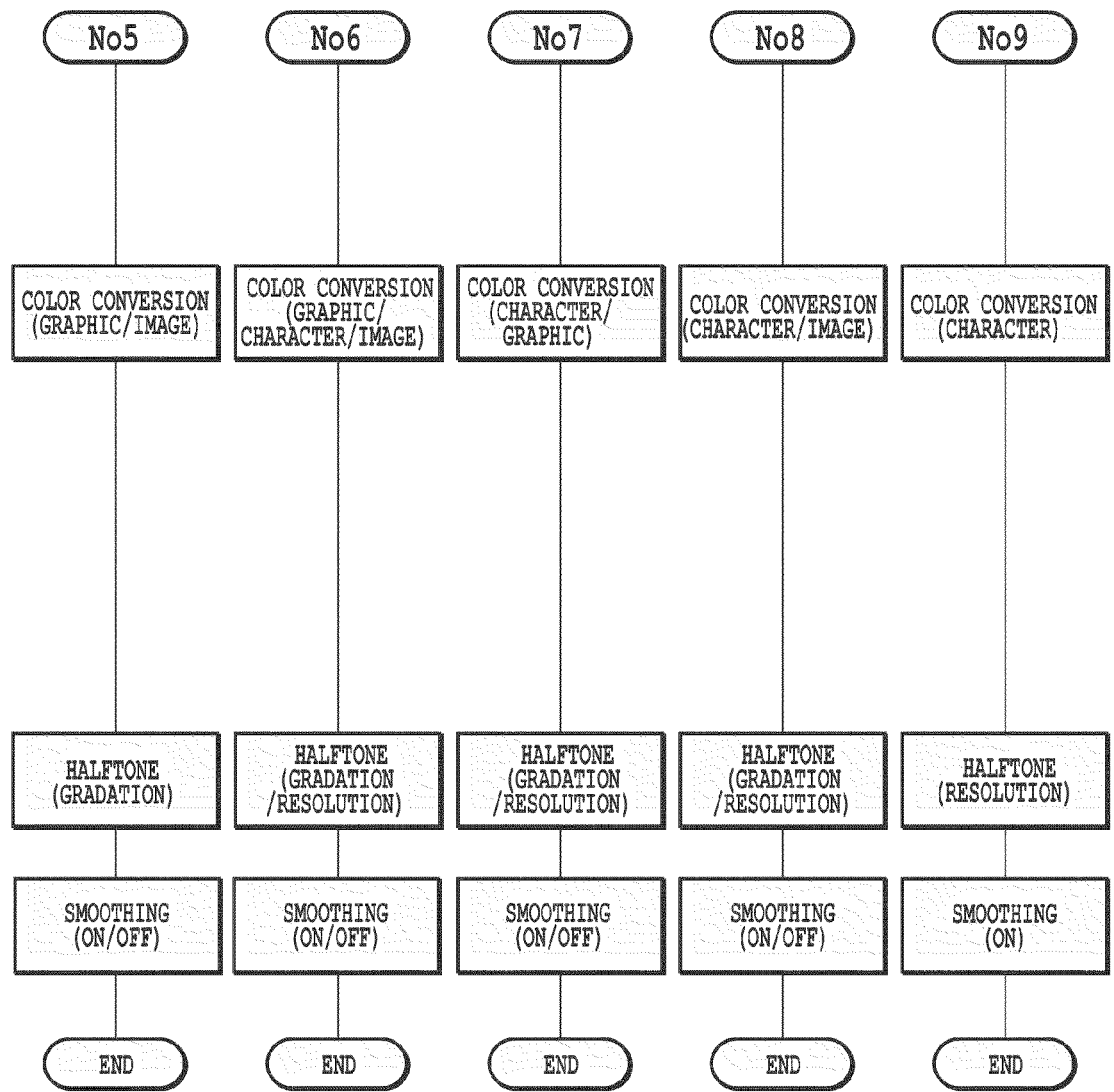
FIG. 11B is a view showing image processing flows of the block groups.

FIG. 11 collectively shows the image processing flows of all the block groups. The image processing flows of the respective block groups include only necessary image processing modules. As shown in FIG. 11, the image processing flows of the respective block groups include any one or some of background removal processing, color conversion processing, density correction processing, filter processing, halftone processing, and smoothing processing.

<Detailed Description of the Image Processing Area Constructing Unit 214>

Figure 12:
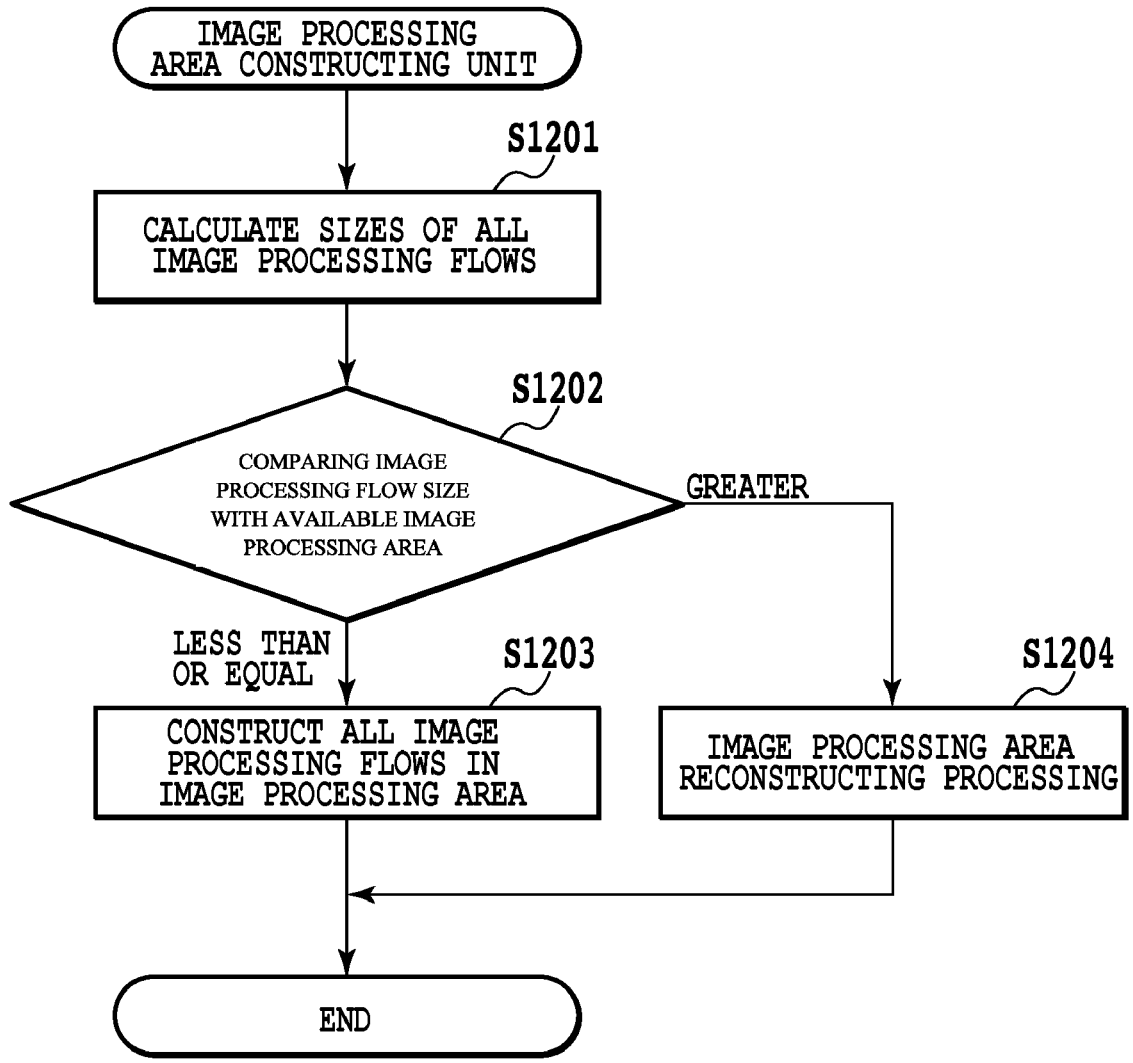
FIG. 12 is a view showing a flowchart of processings of an image processing area constructing unit 214 in the image processing apparatus 10.

FIG. 12 is a view showing a flowchart of processings of the image processing area constructing unit 214 in the image processing apparatus 10.

First, in step S1201, the image processing area constructing unit 214 calculates the sizes of all the image processing flows of the respective block groups generated by the image processing flow generating unit 213. The sizes of the image processing flows can be calculated on the basis of the processings included in the image processing flows and the setting values of the respective processings.

Next, in step S1202, the image processing area constructing unit 214 compares the total size of the sizes of all the image processing flows with the image processing area of the image processing unit 216, and determines whether or not the image processing flows of all the block groups can be constructed in the image processing area.

In a case in which the total size of the sizes of the image processing flows is less than or equal to the image processing area in step S1202, it is determined that the image processing flows of all the block groups can be constructed in the image processing area, the process proceeds to step S1203.

Then, in step S1203, the image processing area constructing unit 214 constructs the image processing flows of all the block groups (from No0 to No9) in the image processing area.

On the other hand, in a case in which the total size of the sizes of the image processing flows is greater than the image processing area in step S1202, the image processing area constructing unit 214 determines that it is impossible to construct the image processing flows of all the block groups in the image processing area, the process proceeds to step S1204.

Then, in step S1204, the image processing flows are reconstructed by image processing area reconstructing processing in order to construct the image processing flows in the image processing area, and the reconstructed image processing flows are constructed in the image processing area.

In addition, in the present embodiment, as described in the explanations of step S1203 and step S1204, a plurality of constructing units may be provided. In such a case, those may be called "first constructing unit" and "second constructing unit."

Figure 13:
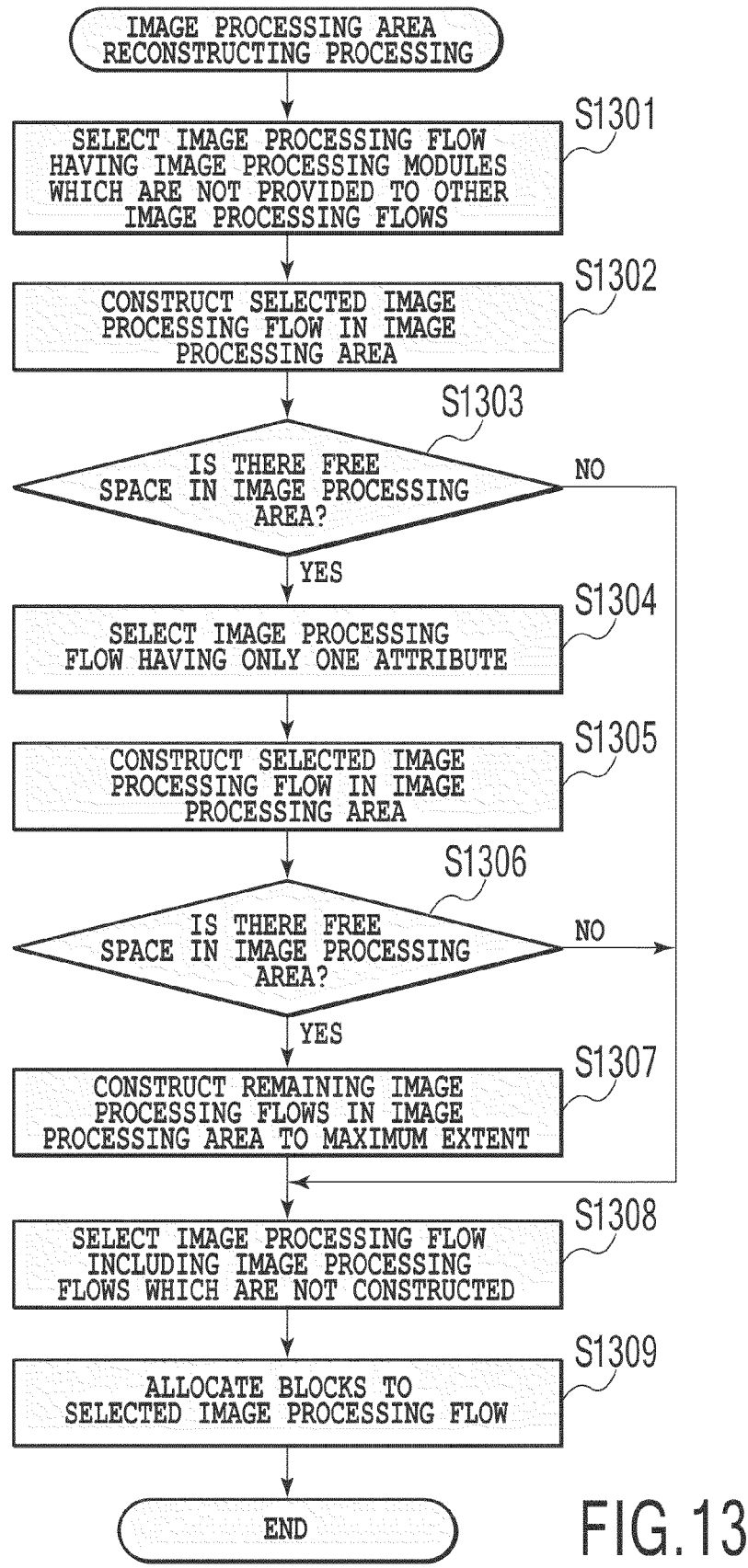
FIG. 13 is a view showing a flowchart of processings in step S1204.

FIG. 13 is a view showing a flowchart of the image processing area reconstructing processing of step S1204 in FIG. 12.

In the image processing area reconstructing processing of step S1204 in FIG. 12, first, in step S1301, the image processing area constructing unit 214 selects image processing flows having image processing modules which are not provided to the image processing flows in the other block groups.

For example, in FIG. 11, the No2 (Scan image, graphic) image processing flow has image processing modules which are not provided to the other No image processing flows. Those are, for example, background removal processing set to "ON/OFF," color conversion processing set to "Scan image/graphic," density correction processing whose level is set to "2," and filter processing set to "ON (sharp, smooth)/ OFF." Moreover, for example, the No6 (image/character/graphic) image processing flow has image processing modules such as color conversion processing set to "graphic/character/image" which are not provided to the other image processing flows.

Next, in step S1302, the image processing area constructing unit 214 constructs the image processing flows selected in step S1301 in the image processing area.

As a result, it is possible to preferentially construct the image processing flows having image processing modules which are not provided to image processing flows in other block groups among the image processing flows of the respective block groups.

Next, in step S1303, the image processing area constructing unit 214 determines whether or not there is still a free space in the image processing area.

When it is determined that there is a free space in the image processing area in step S1303, the process proceeds to step S1304.

When it is determined that there is no free space in the image processing area in step S1303, the process proceeds to step S1308.

In step S1304, the image processing area constructing unit 214 selects image processing flows of block groups having only one attribute in the respective block groups. Here, in the image processing flows having only one attribute, there is no need to switch settings in the image processing modules, which enables high-speed processing. For example, among the image processing flows of the respective block groups in FIG. 11, the No1 (Scan image), No3 (graphic), No4 (image), and No9 (character) image processing flows are image processing flows having only one attribute.

Next, in step S1305, the image processing area constructing unit 214 constructs the image processing flows selected in step S1304 in the image processing area. As a result, the image processing flows of the block groups having only one piece of attribute information are preferentially constructed in the image processing area.

Next, in step S1306, the image processing area constructing unit 214 determines whether or not there is still a free space in the image processing area.

When it is determined that there is a free space in the image processing area in step S1306, the process proceeds to step S1307, and the image processing area constructing unit 214 constructs the image processing flows in the remaining block groups in the image processing area to a maximum extent.

When it is determined that there is no free space in the image processing area in step S1306, the process proceeds to step S1308.

Next, in step S1308, the image processing area constructing unit 214 selects image processing flows including the attributes of the image processing flows of block groups which are not constructed in the image processing area among the image processing flows already constructed in the image processing area.

Next, in step S1309, the image processing area constructing unit 214 allocates blocks in the block groups which are not constructed in the image processing area to the image processing flows selected in step S1308.

For example, in a case in which image processing flows of block groups constructed in the image processing area are the No2, No6, No1, No3, No4, and No9 image processing flows, image processing flows of block groups which are not constructed in the image processing area are to be the No5, No7, and No8 image processing flows. In this case, the blocks in the No5 (image, graphic) block group are allocated to the No6 (image, character, graphic) image processing flow including an image and a graphic attribute. As a result, image processings are executed onto the blocks in the No5 (image, graphic) block group in the No6 image processing flow. In the same way, the blocks in the No7 (character, graphic) and No8 (image, character) block groups are allocated to the No6 image processing flow.

As a result, it is possible to allocate the blocks in the block groups which are not constructed in the image processing area to the image processing flows including the image processing modules of the block groups which are not constructed in the image processing area by the reconstructing of image processing flows.

As described above, an image processing flow is constructed from only image processing modules necessary for each block. Then, a plurality of image processing flows are constructed in accordance with the image processing area, which enables economical parallel processing by use of the image processing area to a maximum extent, that makes it possible to perform high-speed image processing.

Embodiment 2

In Embodiment 2, in a case in which blocks onto which image processings are executed are concentrated on a specific image processing flow among the plurality of image processing flows constructed in the image processing area in Embodiment 1 described above, the blocks are distributed to increase the efficiency of parallel processing.

Hereinafter, Embodiment 2 will be described in detail with reference to the drawings.

Figure 14:
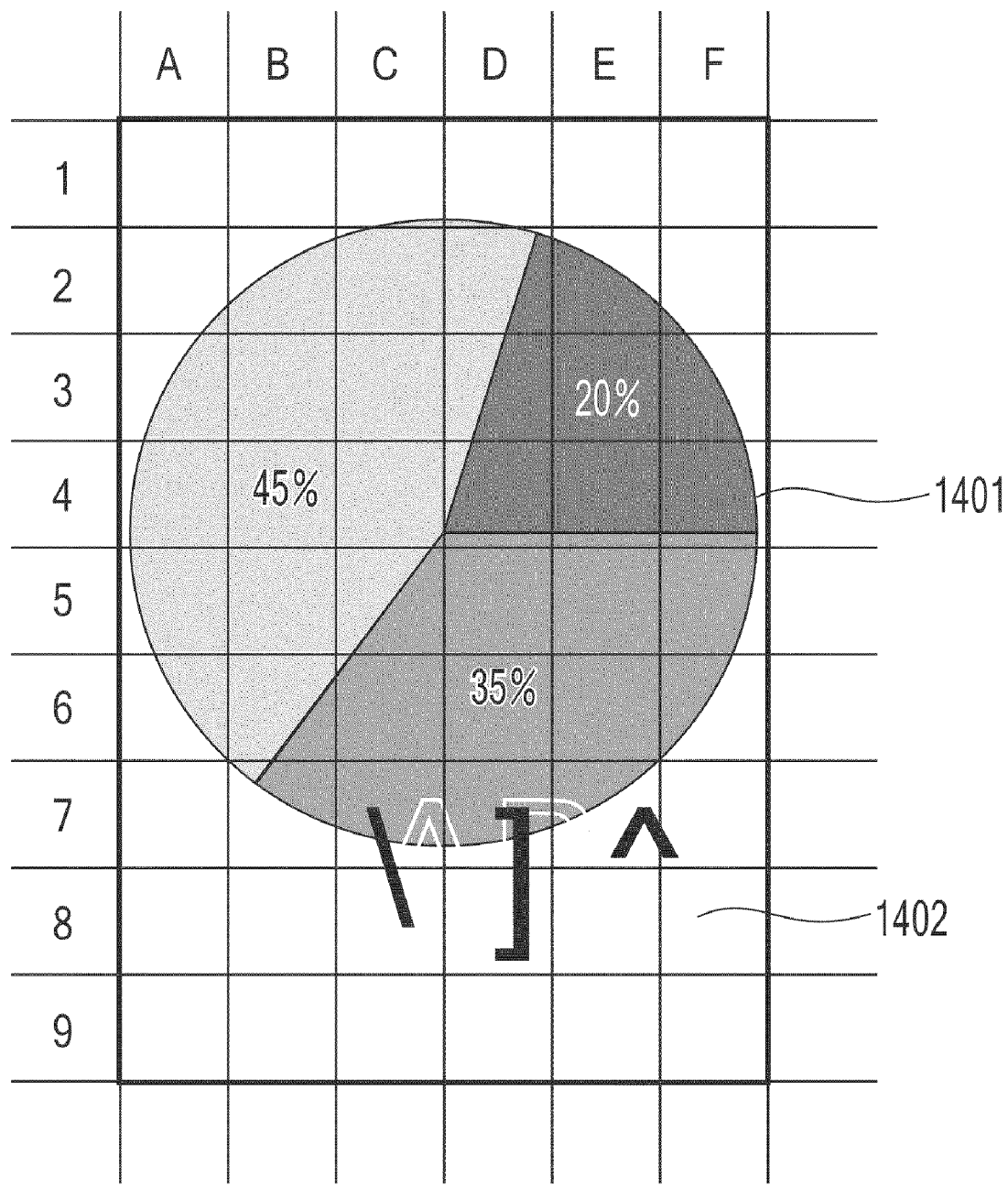
FIG. 14 is a diagram showing an example of image data in Embodiment 2.

FIG. 14 shows an example of image data. The image data includes a graphic 1401 and characters 1402. Block groups are formed by the blocking processing (FIG. 4) of the blocking processing unit 212 described above with respect to the image data of FIG. 14. In this case, with respect to the image data, there exist four attributes, the No0 (only background), No3 (only graphic), No7 (graphic and character), and No9 (only character) out of the attributes in the patterns shown in FIG. 7, and the four types of block groups are formed as shown in FIG. 15.

Next, image processing flows of the respective block groups constructed from the necessary image processing modules are formed by the processing shown in FIG. 8 of the image processing flow generating unit 213 described above.

Figure 16:
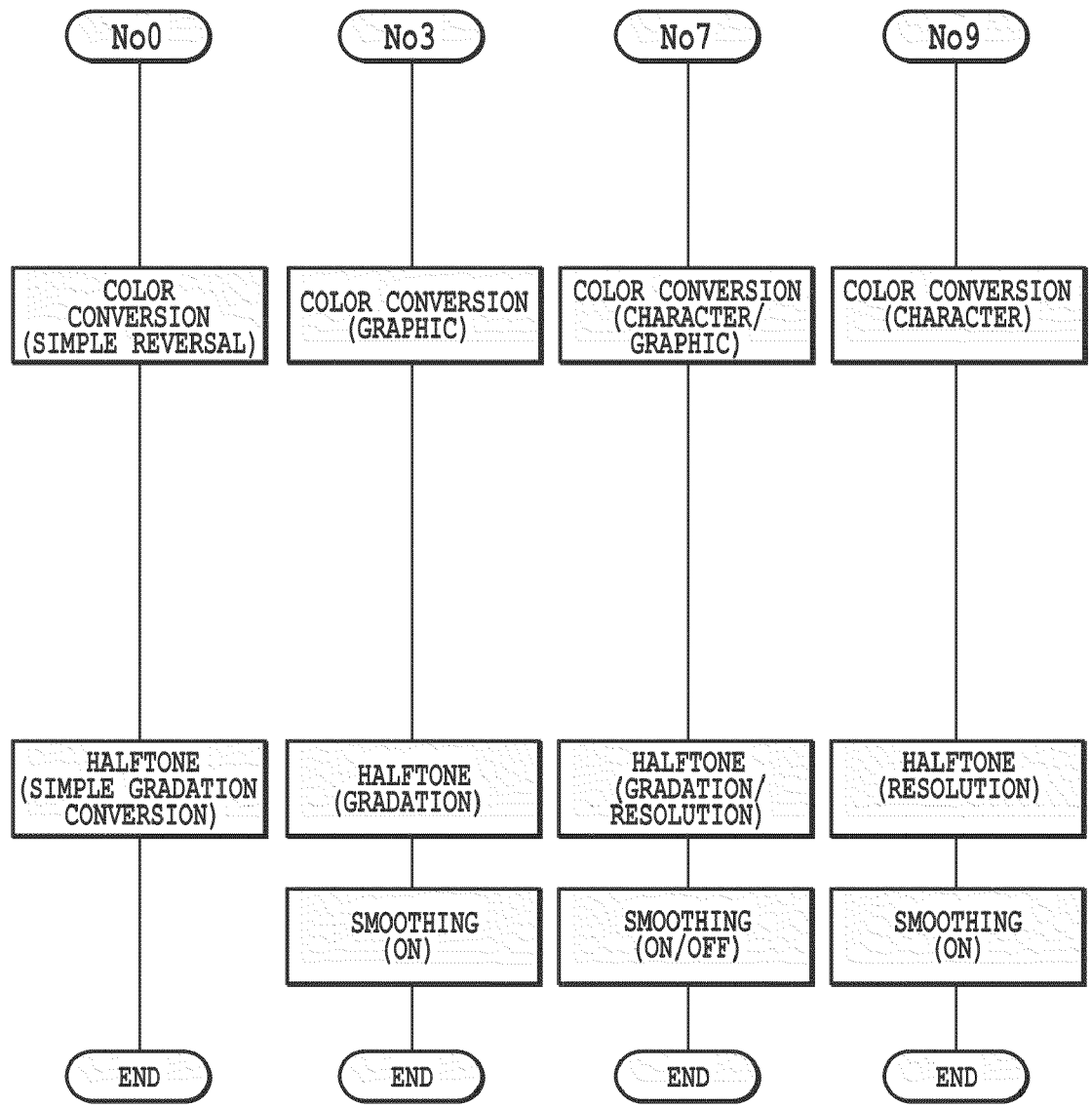
FIG. 16 is a view showing image processing flows of block groups in Embodiment 2.

FIG. 16 shows the image processing flows generated by the image processing flow generating unit 213, and those are the No0 (only background), No3 (only graphic), No7 (graphic and character), and No9 (only character) four image processing flows.

Figure 17:
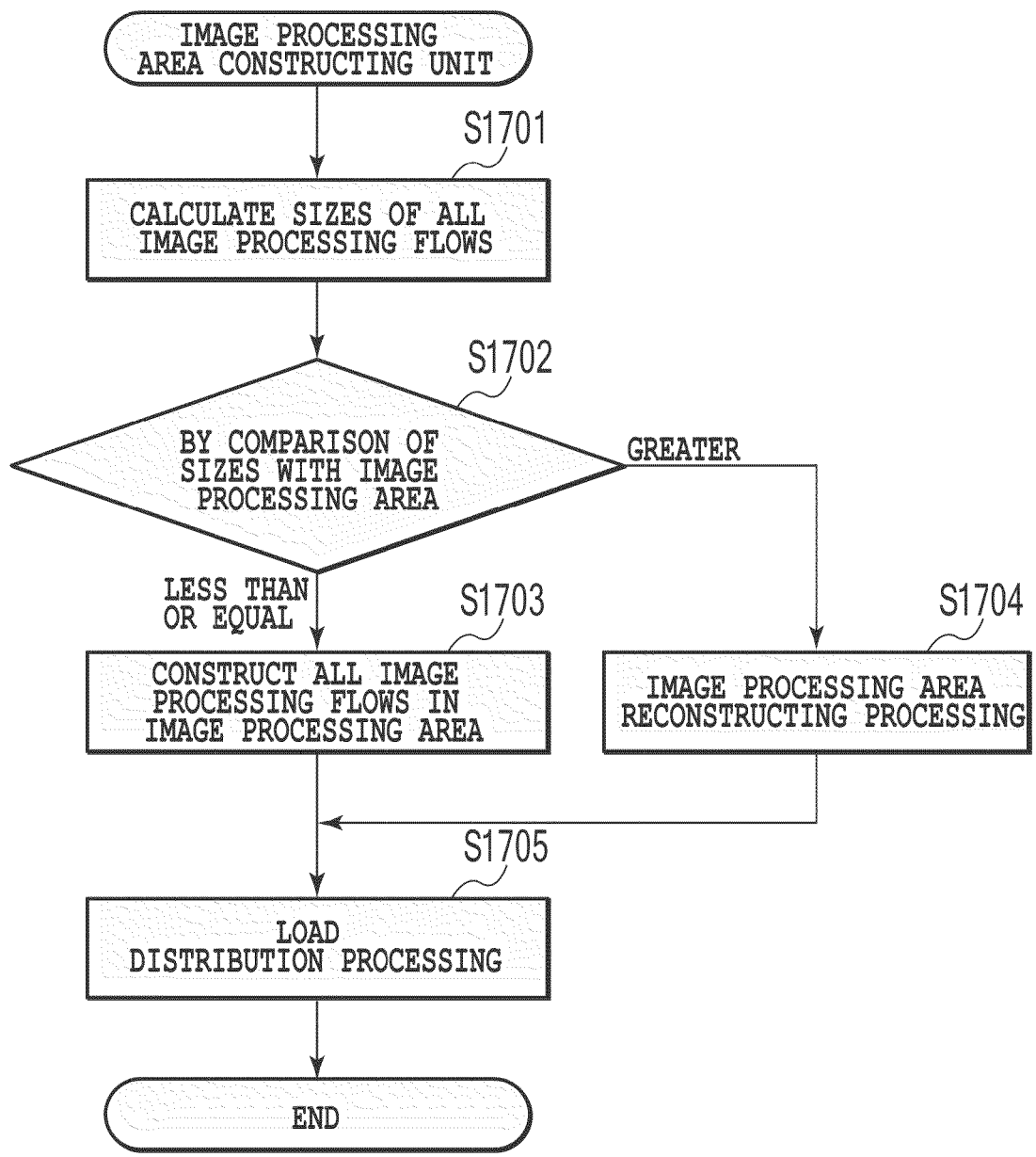
FIG. 17 is a view showing a flowchart of processings of the image processing area constructing unit 214 in Embodiment 2.

FIG. 17 is a view showing a flowchart of processings of the image processing area constructing unit 214 in the image processing apparatus 10 according to Embodiment 2. Steps S1701 to S1704 in FIG. 17 are the same as steps S1201 to S1204 in FIG. 12 in Embodiment 1 described above.

First, in step S1701, the image processing area constructing unit 214 calculates the sizes of all the image processing flows generated by the image processing flow generating unit 213.

Next, in step S1702, the image processing area constructing unit 214 compares the total size of the sizes of all the image processing flows with the image processing area of the printer image processing unit 216.

In a case in which the total size of the image processing flows is less than or equal to the image processing area in step S1702, the image processing area constructing unit 214 constructs the image processing flows of all the block groups (No0, No3, No7, and No9) in the image processing area in step S1703.

On the other hand, in a case in which the total size of the image processing flows is greater than the image processing area in step S1702, the image processing area constructing unit 214 performs reconstructing of the image processing flows in order to construct the image processing flows in the image processing area in step S1704.

Next, the image processing area constructing unit 214 executes load distribution processing of step S1705 in order to prevent blocks from being concentrated on a specific image processing flow among the constructed image processing flows (FIG. 16).

Figure 18:
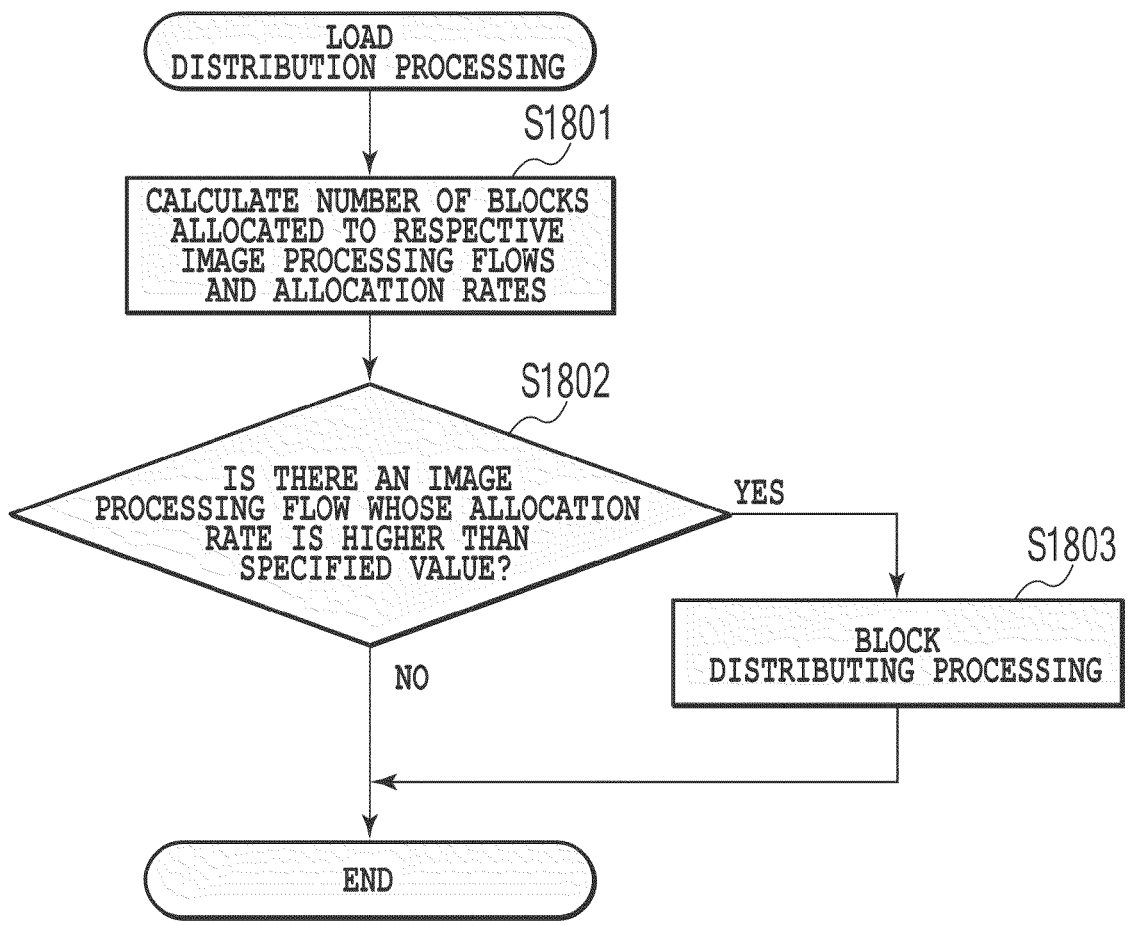
FIG. 18 is a view showing a flowchart of processings in step S1705.

FIG. 18 is a view showing a flowchart of the load distribution processing of step S1705 in FIG. 17.

First, in step S1801, the image processing area constructing unit 214 calculates the numbers of blocks to be allocated to the respective image processing flows (FIG. 16) constructed in the image processing area and their allocation rates.

Next, in step S1802, the image processing area constructing unit 214 determines whether or not there are image processing flows whose allocation rates calculated in step S1801 are higher than a specified value.

When it is determined that there are image processing flows whose allocation rates are higher than the specified value in step S1802, in step S1803, the image processing area constructing unit 214 carries out distribution of blocks by block distributing processing.

Hereinafter, steps S1801 and S1802 in FIG. 18 will be described with reference to FIGS. 19 and 20.

In step S1801, the blocks (FIG. 15) in which the image data (FIG. 14) is blocked are allocated to the respective image processing flows shown in FIG. 16, and allocation rates with respect to all the blocks are calculated, which are as shown in FIG. 19.

That is, 13 blocks are allocated to the No0 (background) image processing flow, and its allocation rate is 20%. Further, 33 blocks are allocated to the No3 (graphic) image processing flow, and its allocation rate is 52%. Further, 3 blocks are allocated to the No7 (character/graphic) image processing flow, and its allocation rate is 5%. Further, 5 blocks are allocated to the No9 (character) image processing flow, and its allocation rate is 8%.

The specified value is to be a % or more of an average rate, and is expressed by the specified value P=1/the number of image processing flows*α% (formula 1). Accordingly, given that the number of image processing flows is four, and α is 120%, P=1/4*1.2=0.3 (30%), which leads to the specified value P=30%. In addition, the specified value is not limited to the above-described (formula 1), and may be any value by which it is possible to determine that blocks are concentrated on a specific image processing flow, and the load on image processings is uneven.

An allocation rate of the No3 (graphic) image processing flow is 52%, which is higher than the specified value 30% in the above-described example. Therefore, it is determined that the allocation rate is higher than the specified value in step S1802 in FIG. 18, and distribution of blocks is carried out by block distributing processing of step S1803 in FIG. 18.

On the other hand, when it is determined that there is no image processing flow whose allocation rate is higher than the specified value in step S1802, the processing is completed.

Figure 20:
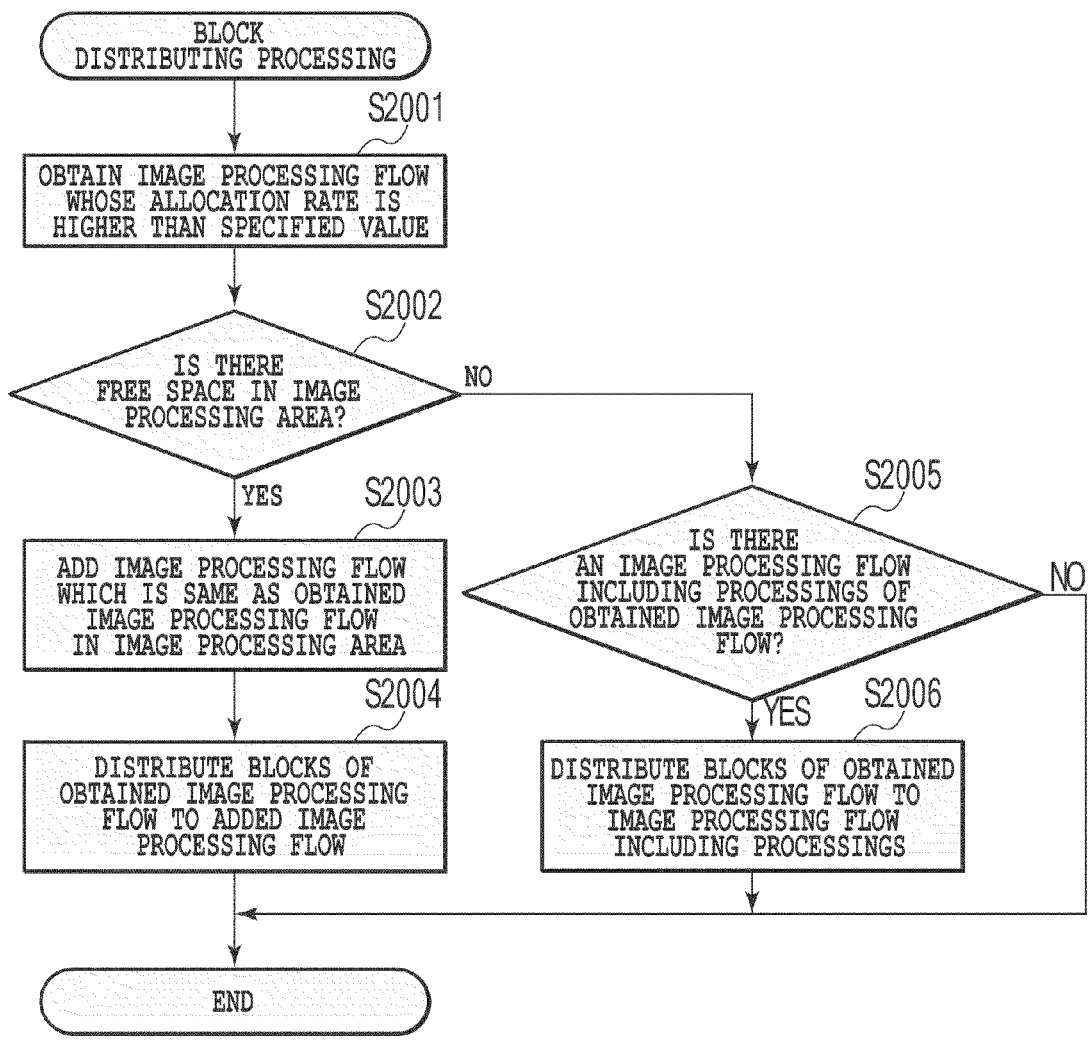
FIG. 20 is a view showing a flowchart of processings in step S1803.

FIG. 20 is a view showing a flowchart of the block distributing processing of step S1803.

First, in step S2001, the image processing area constructing unit 214 obtains an image processing flow whose allocation rate of blocks is higher than the specified value.

Next, in step S2002, the image processing area constructing unit 214 determines whether or not there is a free space in which the obtained image processing flow whose allocation rate of blocks is higher than the specified value can be additionally constructed in the image processing area in which the respective image processing flows are constructed.

When it is determined that there is a free space in step S2002, in step S2003, the image processing area constructing unit 214 adds an image processing flow which is the same as the obtained image processing flow whose allocation rate of blocks is higher than the specified value, to construct it in the image processing area. As a result, in a case in which the number of blocks onto which image processings are executed in the image processing flows of the respective block groups constructed in the image processing area is concentrated on a specific image processing flow, the image processing flow on which the blocks are concentrated is added to the image processing area.

Then, in step S2004, the image processing area constructing unit 214 distributes half of the blocks allocated to the obtained image processing flow whose allocation rate of blocks is higher than the specified value, to the newly added image processing flow.

Figure 21:
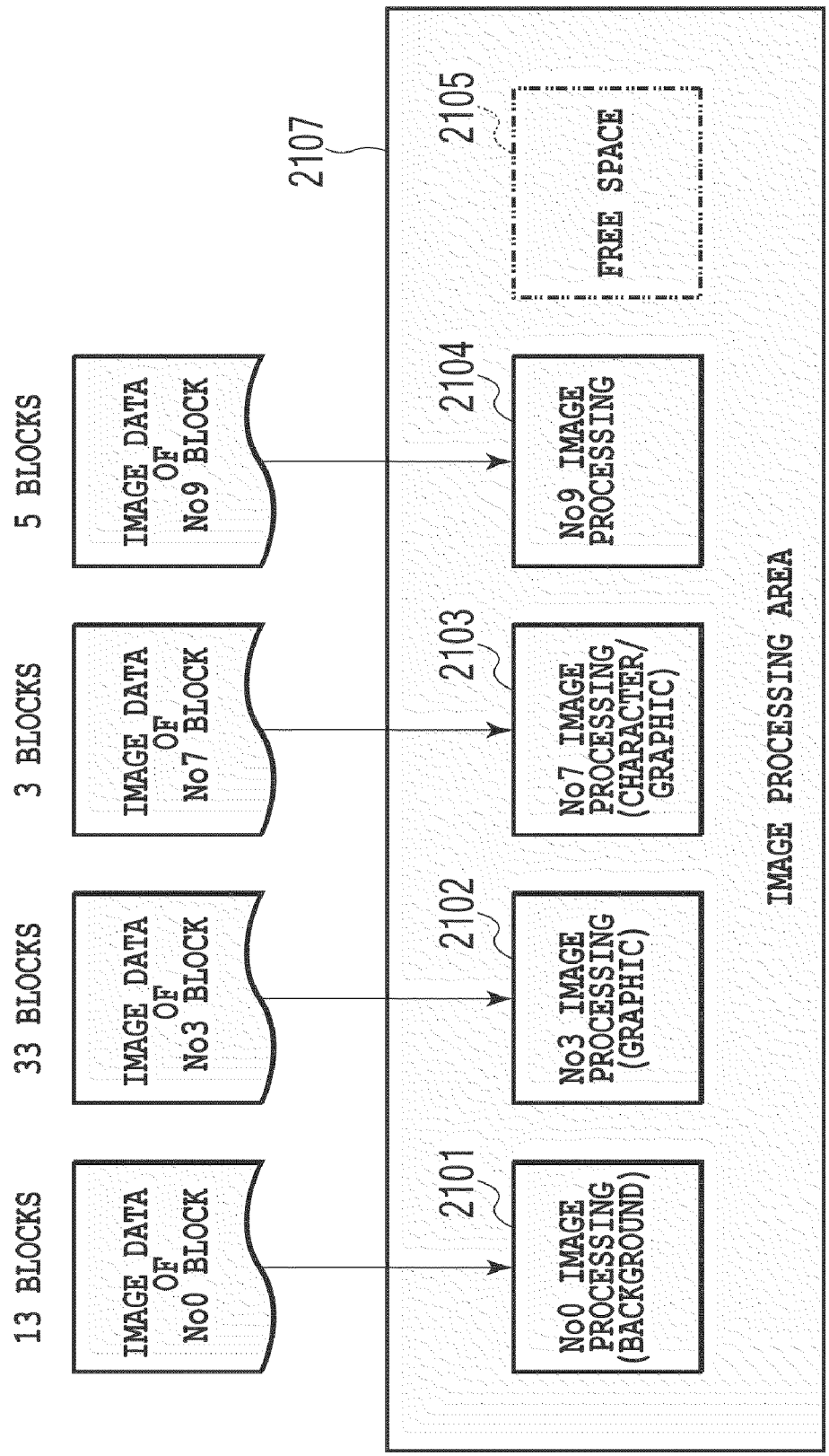
FIG. 21 is a view showing an example of an image processing area before block distributing processing when there is a free space.
Figure 22:
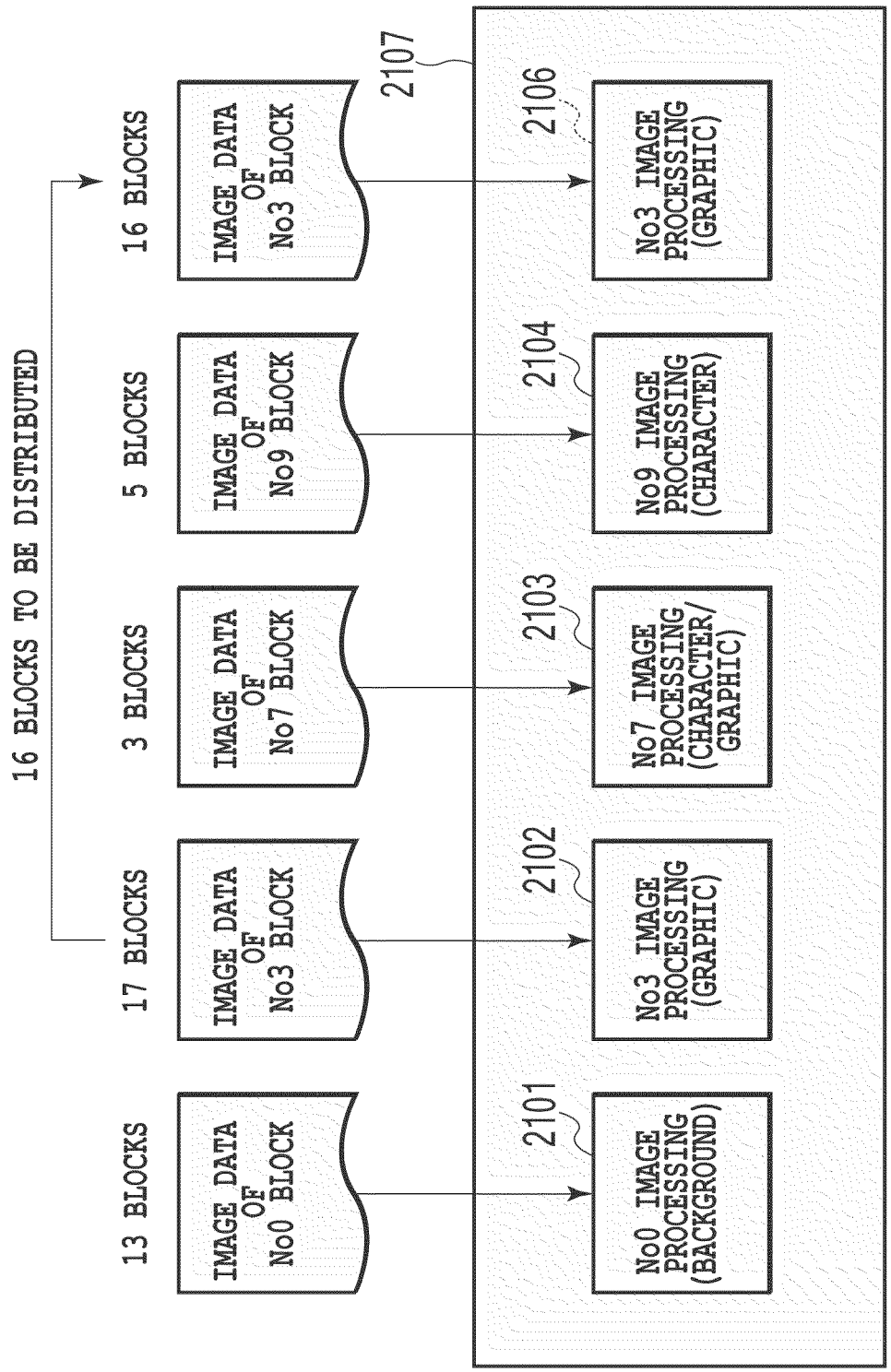
FIG. 22 is a view showing an example of the image processing area after block distributing processing when there is no free space.

For example, FIG. 21 is a view showing the image processing area before block distributing processing, and FIG. 22 is a view showing the image processing area after block distributing processing. In the image processing area 2107 before block distributing processing of FIG. 21, there exist respective image processing flows 2101 to 2104 already constructed and a free space 2105 to which an image processing flow can be added. Then, blocks onto which processings are executed are allocated to the respective image processing flows.

As shown in the examples of FIGS. 21 and 22, an image processing flow which is the same as the image processing flow (No3) 2102 whose allocation rate of blocks is higher than the specified value, which is obtained in step S2001, is additionally constructed in the free space 2105 in step S2003. Then, as shown in FIG. 22, half (16) of the 33 blocks allocated to the image processing flow (No3) 2102 are distributed to a newly added image processing flow 2106 in step S2004.

When it is determined that there is no free space in the image processing area in step S2002, in step S2005, the image processing area constructing unit 214 determines whether or not there is an image processing flow including the attributes of the obtained image processing flow whose allocation rate of blocks is higher than the specified value.

When it is determined that there is an image processing flow including the attributes in step S2005, the process proceeds to step S2006.

In step S2006, the image processing area constructing unit 214 distributes the blocks allocated to the obtained image processing flow whose allocation rate of blocks is higher than the specified value, to the image processing flow including the attributes.

The distribution is carried out such that the number of blocks of the obtained image processing flow whose allocation rate of blocks is higher than the specified value and the number of blocks allocated to the image processing flow including the attributes are approximately the same number.

As a result, the following advantageous effect is possible in a case in which the number of blocks onto which image processings are executed in the image processing flows of the respective block groups constructed in the image processing area is concentrated on a specific image processing flow. That is, it is possible to distribute the blocks to an image processing flow including the image processing modules of the image processing flow on which the blocks are concentrated.

In addition, in the present embodiment, as described in the explanations of steps S2004 and S2006, a plurality of distribution devices may be provided. In such a case, those may be called "first distribution device" and "second distribution device."

Figure 23:
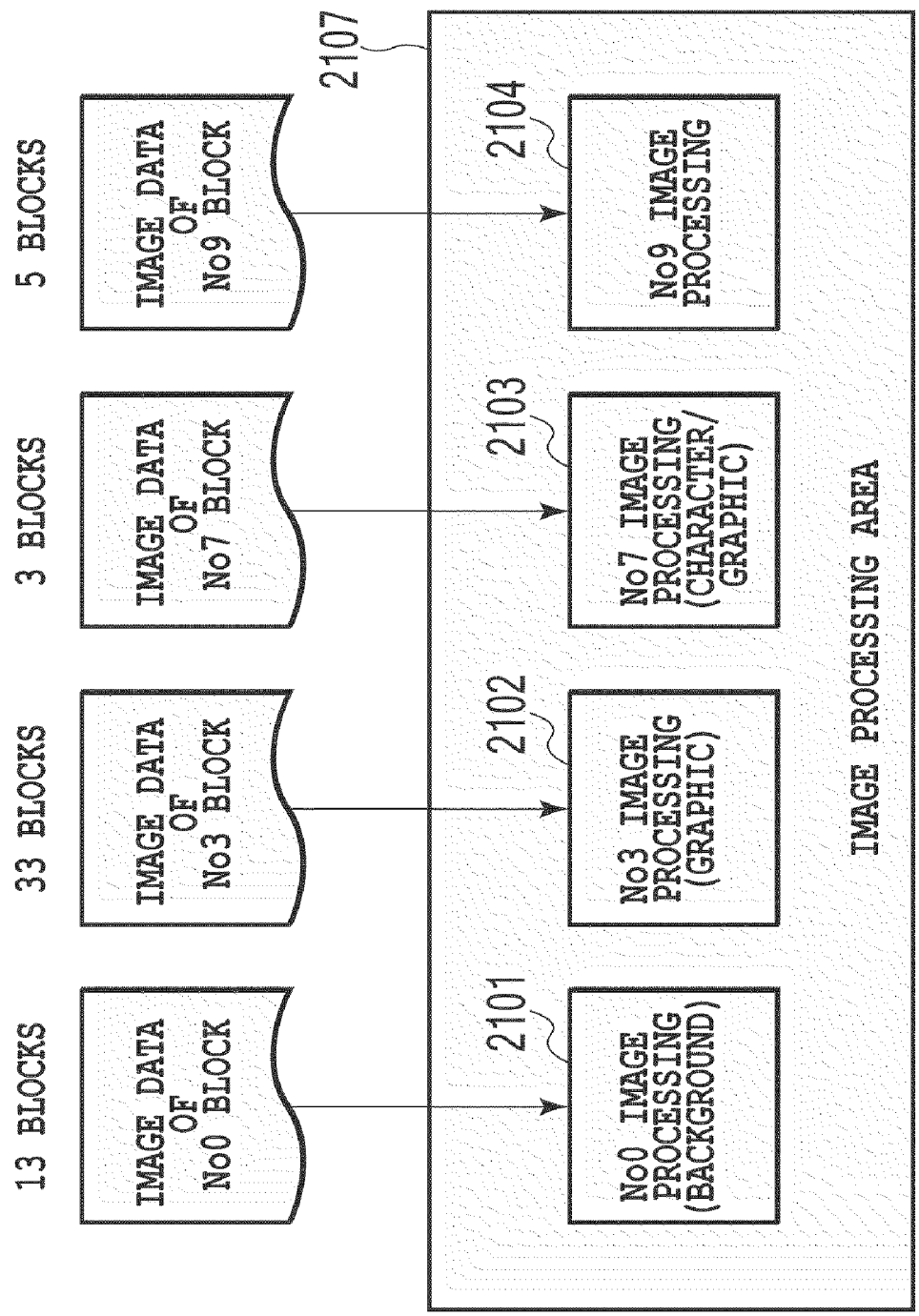
FIG. 23 is a view showing an example of the image processing area before block distributing processing when there is a free space.
Figure 24:
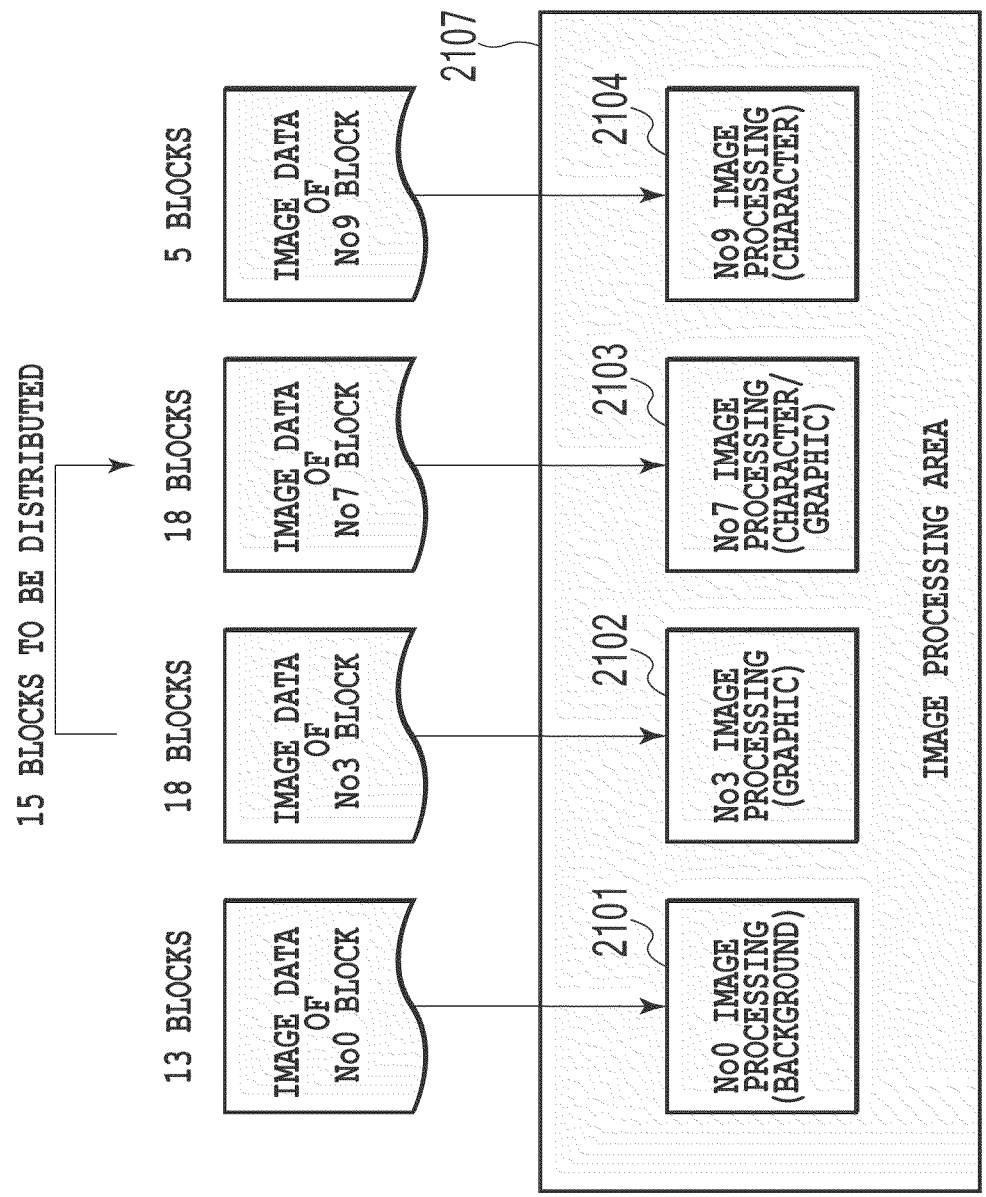
FIG. 24 is a view showing an example of the image processing area after block distributing processing when there is no free space.

For example, FIG. 23 is a view showing the image processing area before block distributing processing when there is no free space in the image processing area, and FIG. 24 is a view showing the image processing area after block distributing processing. In the image processing area 2107 before block distributing processing in FIG. 23, there exist the respective image processing flows 2101 to 2104 already constructed, and blocks on which processings are applied are allocated to the respective image processing flows.

The image processing flow (No3) 2102 whose allocation rate of blocks is higher than the specified value, which is obtained in step S2001, has only graphic as an attribute. Among the other image processing flows in FIG. 23, the No7 image processing flow 2103 has graphic and character, and includes the No3 image processing flow 2102.

Therefore, the blocks allocated to the No3 image processing flow 2102 in FIG. 23 can be distributed to the No7 image processing flow 2103.

As shown in FIG. 24, the distribution is carried out such that the number of blocks allocated to the No7 image processing flow 2103 and the number of blocks allocated to the No3 image processing flow 2102 are approximately the same. For example, as shown in FIG. 24, 15 blocks out of the 33 blocks allocated to the No3 image processing flow 2102 are distributed to the No7 image processing flow 2103.

As described above, in a case in which blocks onto which image processings are executed are concentrated on a specific image processing flow among the plurality of image processing flows constructed in the image processing area, it is possible to distribute the blocks to increase efficiency of parallel processing.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-216919, filed Aug. 26, 2008 which is hereby incorporated by reference herein in its entirety.

What is claimed is:

1. An image processing apparatus comprising:
   a segmentation unit configured to segment image data into a plurality of blocks;
   a discrimination unit configured to discriminate an attribute in each of the segmented blocks;
   a generating unit configured to select at least one image processing module for each attribute in accordance with the discriminated attribute and the content of image processing made to correspond to the attribute, and to generate an image processing flow for each block by use of the selected image processing module or modules;
   a determination unit configured to determine whether or not the generated image processing flows can be constructed in an image processing area; and
   a constructing unit configured to construct the image processing flows in the image processing area when it is determined that the image processing flows can be constructed in the image processing area as a result of the determination, and when it is determined that a processing area of the image processing flows cannot be constructed in the image processing area as a result of the determination, the constructing unit selects an image processing flow having an image processing module which is not contained the other image processing flows, to construct the selected image processing flow in the image processing area such that the processing area of the image processing flow is included in the image processing area.

2. The image processing apparatus according to claim 1, wherein the constructing unit preferentially constructs an image processing flow for a block with one piece of attribute information among the plurality of image processing flows, in the image processing area.

3. The image processing apparatus according to claim 1, wherein the constructing unit allocates blocks which are not constructed in the image processing area to an image processing flow including image processing modules of the blocks which are not constructed in the image processing area.

4. The image processing apparatus according to claim 1, wherein the attribute includes any one of an image scanned by an image scanner, a picture, a character, and a graphic.

5. The image processing apparatus according to claim 4, wherein the image processing flow includes any one of background removal processing, color conversion processing, density correction processing, filter processing, halftone processing, and smoothing processing.

6. An image processing method comprising:
   a segmentation step of segmenting image data into a plurality of blocks;
   a discrimination step of discriminating an attribute in each of the segmented blocks;
   a generating step of selecting at least one image processing module for each attribute in accordance with the discriminated attribute and the content of image processing made to correspond to the attribute, and generating an image processing flow for each block by use of the selected image processing module or modules;
   a determination step of determining whether or not the generated image processing flows can be constructed in an image processing area; and
   a constructing step of constructing the image processing flows in the image processing area when it is determined that the image processing flows can be constructed in the image processing area as a result of the determination, and when it is determined that a processing area of the image processing flows cannot be constructed in the image processing area as a result of the determination judgment, the constructing step selects an image processing flow having an image processing module which is not contained in the other image processing flows, to construct the selected image processing flow in the image processing area such that the processing area of the image processing flow is included in the image processing area.

7. A non-transitory computer-readable storage medium on which a program for making a computer execute an image processing method is stored, the image processing method includes:
- a segmentation step of segmenting image data into a plurality of blocks;
- a discrimination step of discriminating an attribute in each of the segmented blocks;
- a generating step of selecting at least an image processing module for each attribute in accordance with the discriminated attribute and the content of image processing made to correspond to the attribute, and generating an image processing flow for each block by use of the selected image processing module or modules;
- a determination step of determining whether or not the image processing flows can be constructed in an image processing area; and
- a constructing step of constructing the image processing flows in the image processing area when it is determined that the image processing flows can be constructed in the image processing area as a result of the determination, and when it is determined that a processing area of the image processing flows cannot be constructed in the image processing area as a result of the determination, the constructing step selects an image processing flow having an image processing module which is not contained in the other image processing flows, to construct the selected image processing flow in the image processing area such that the processing area of the image processing flow is included in the image processing area.

* * * * *